June 4, 1929. E. J. KEARNEY ET AL 1,715,604
TRANSMISSION AND CONTROL MECHANISM FOR MACHINE TOOLS
Filed Jan. 18, 1926 10 Sheets-Sheet 4

INVENTORS
Edward J Kearney
Joseph B Armitage
BY
Fred G Parsons
ATTORNEY

June 4, 1929.  E. J. KEARNEY ET AL  1,715,604
TRANSMISSION AND CONTROL MECHANISM FOR MACHINE TOOLS
Filed Jan. 18, 1926   10 Sheets-Sheet 6

INVENTORS
Edward J. Kearney
Joseph B. Armitage
BY Fred G. Parsons
ATTORNEY

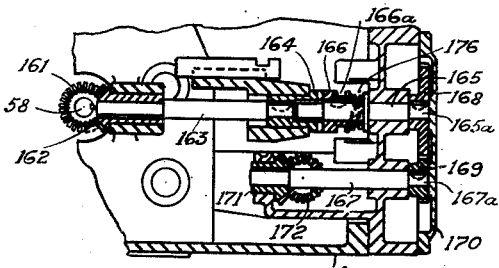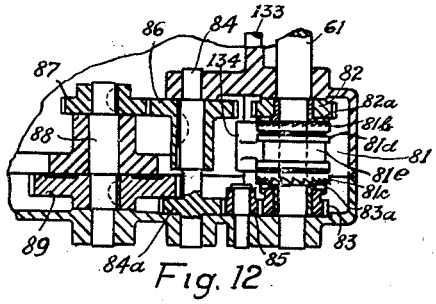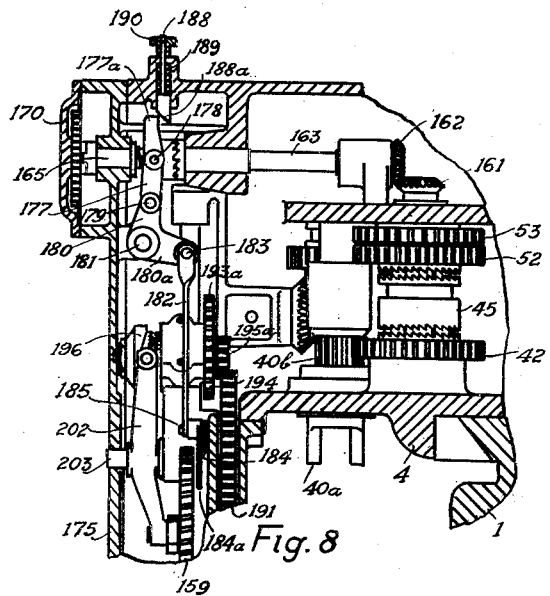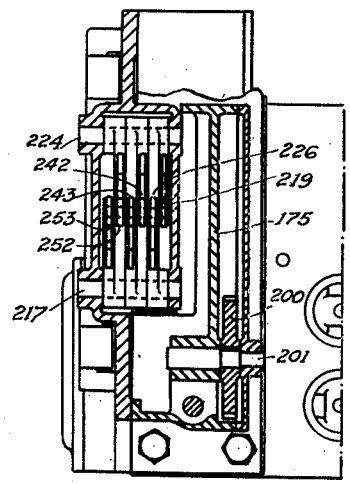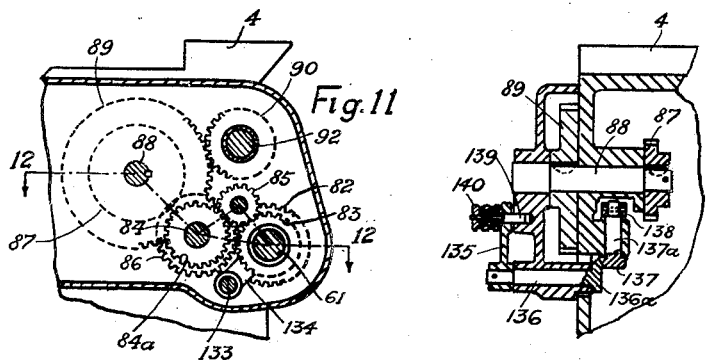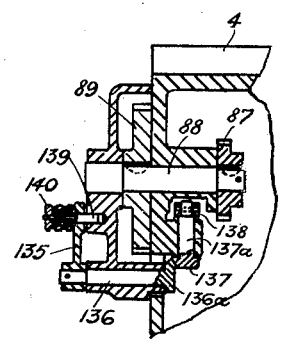

June 4, 1929.  E. J. KEARNEY ET AL  1,715,604
TRANSMISSION AND CONTROL MECHANISM FOR MACHINE TOOLS
Filed Jan. 18, 1926  10 Sheets-Sheet 8

INVENTORS
Edward J. Kearney
Joseph B. Armitage
BY Fred G. Parsons
ATTORNEY

June 4, 1929.  E. J. KEARNEY ET AL  1,715,604
TRANSMISSION AND CONTROL MECHANISM FOR MACHINE TOOLS
Filed Jan. 18, 1926  10 Sheets-Sheet 9

INVENTORS
Edward J Kearney
Joseph B Armitage
BY
Fred G Parsons
ATTORNEY

June 4, 1929.   E. J. KEARNEY ET AL   1,715,604
TRANSMISSION AND CONTROL MECHANISM FOR MACHINE TOOLS
Filed Jan. 18, 1926    10 Sheets-Sheet 10

INVENTORS
Edward J. Kearney
Joseph B. Armitage
BY Fred G. Parsons
ATTORNEY

Patented June 4, 1929.

1,715,604

UNITED STATES PATENT OFFICE.

EDWARD J. KEARNEY, OF WAUWATOSA, AND JOSEPH B. ARMITAGE, OF MILWAUKEE, WISCONSIN, ASSIGNORS TO KEARNEY & TRECKER CORPORATION, OF WEST ALLIS, WISCONSIN, A CORPORATION OF WISCONSIN.

TRANSMISSION AND CONTROL MECHANISM FOR MACHINE TOOLS.

Application filed January 18, 1926. Serial No. 82,065.

This invention relates generally to transmission and control mechanism for machine tools. It is a particular purpose to provide, in a machine tool having relatively movable work and tool supports, suitable transmission mechanism for power movement of one or more such supports including clutches selectively shiftable to fully determine such movement, both for duration, rate and direction, and to provide means for selectively shifting any or all of such clutches at predetermined intervals and in a predetermined order or sequence.

A further purpose is to provide control mechanism in which power operated control means are provided independently of the movement of the support or supports in order that transmission clutch elements may be shifted when the supports are stationary.

Another purpose is to provide control means in which the change or changes in support movements to be made at any given time and the sequence or order in which desired changes in support movement shall take place is determined by one portion of the control mechanism and the time at which any given changes shall take place, and the interval between successive changes is determined by another and independently adjustable portion of the control mechanism.

Another purpose is to provide power shifting means for the clutches of the support transmission trains in which the shifting will invariably take place at a predetermined rate independent of the rate of movement of other portions of the machine, or of the extent or direction of such movement.

Another purpose is to provide a control system having an independent timing portion including a timing member and transmission therefor which partakes of all the changes of rate which affect any support but which is not affected by a change in the direction of support movement nor by the interruption of support movement, whereby the timing member may be actuated in a continuous rotary cycle, and to provide independent rate change means for the timing member, whereby the duration of its cycle of movement may be altered to bear a desired relationship to the duration of the movement of one of the supports which it controls, or to the combined duration of the movements of several of the supports.

Another purpose is to provide control mechanism for shifting some of the elements of a machine tool support transmission, including an independently clutch controlled power shifter and control mechanism for the shifter including an independently operable timer.

Another purpose is to provide control mechanism having the advantages and characteristics mentioned above, in simplified and convenient combination with other shifting and control means, whereby the movement of the supports may be controlled exclusively by the one or the other method or in part by the one and in part by the other.

Another purpose is to provide complete control mechanism as above described in which the transmission and control mechanism of a simpler and less comprehensive system is utilized in combination without destroying its usefulness or mode of use for the more simple control system, so that, for instance, where the machining operations to be performed are of a simple nature, or the number of parts to be machined does not warrant the complete use of the more highly organized combination, power movement of the supports may be engaged by manual means and later disengaged by dogs on the supports after an interval directly determined by support movement and the position of such dogs.

Another purpose is to simplify and improve the construction and operation of transmission and control mechanism for machine tools and particularly for milling machines.

Other purposes will be apparent from the drawings, description and claims.

The accompanying drawings show the invention embodied in one of the preferred forms and applied to a milling machine commonly known as a horizontal knee type milling machine.

In the drawings like reference characters have been used to denote the same parts in each of the several views of which:

Fig. 1 is a side elevation of the machine. To the left in Fig. 1 is the front, or operating side of the machine and the view is taken from what is considered as the right side, since the operator ordinarily stands facing the machine at the front. Unless otherwise specified the terms front and rear, right and left will be used throughout in accordance with the above.

Fig. 8 is a partial horizontal section taken along line 8—8 of Fig. 5 showing a portion of the control mechanism in the housing at the rear right of the knee.

Fig. 9 is a partial vertical section taken along line 9—9 of Fig. 1 and enlarged.

Fig. 10 is a partial vertical section taken on line 10—10 of Fig. 3.

Fig. 11 is a partial vertical section enlarged along line 11—11 of Fig. 1.

Fig. 12 is a developed sectional view of the gearing shown in Fig. 11, taken along line 12—12 of Fig. 11.

Fig. 13 is a partial vertical section enlarged along line 13—13 of Fig. 2.

Figure 1:
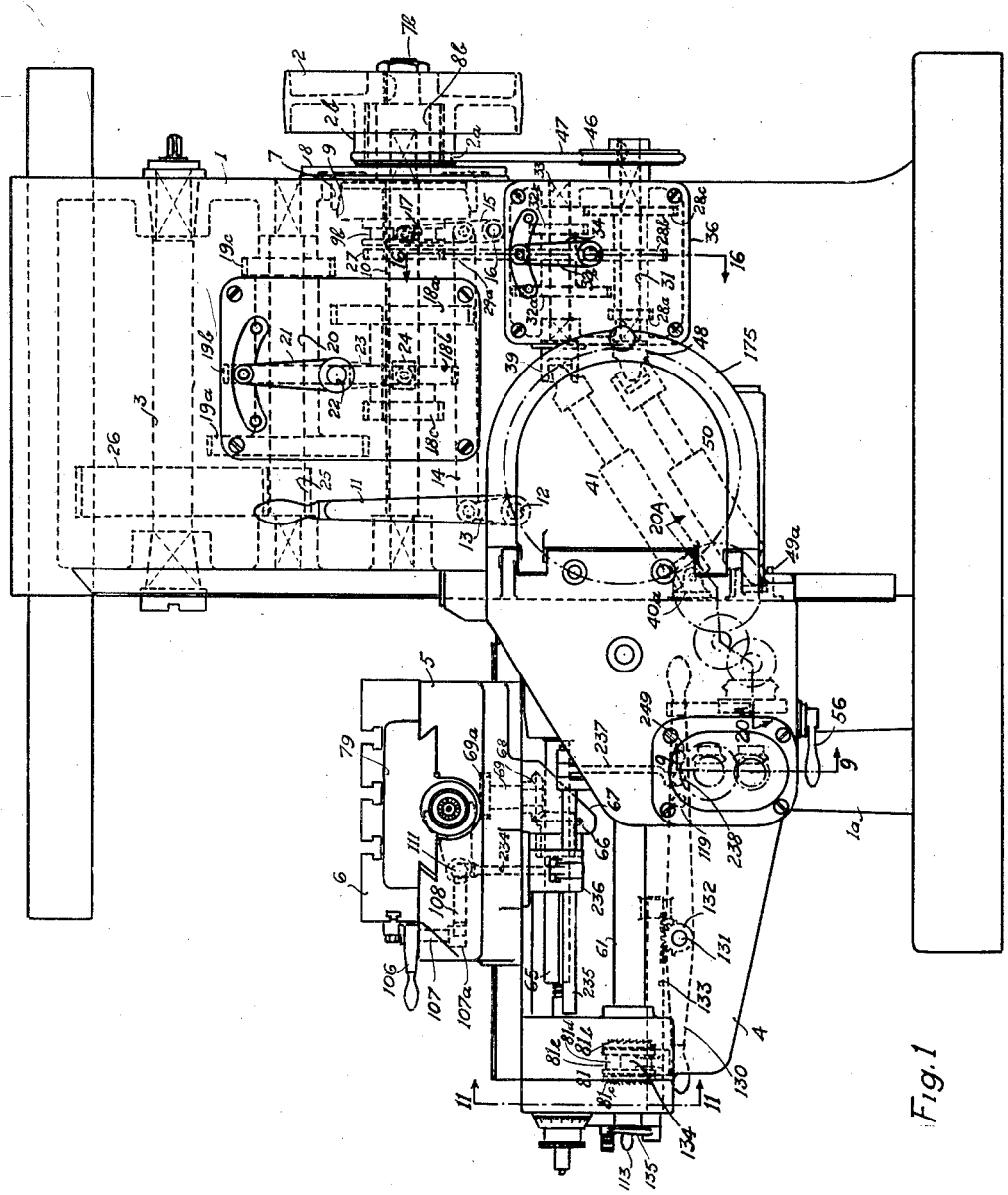

Referring to Fig. 1, a column or main support 1 rotatably supports a main drive pulley 2 adapted for actuation from an outside power source such as a line shaft pulley or a motor. A tool spindle or tool support 3 is likewise rotatably supported from column 1. Slidably guided for vertical movement on column 1 is a knee or support 4 upon which a saddle or support 5 is slidably mounted and guided for movement toward and from the column 1. Saddle 5 carries a table or work support 6 longitudinally guided and slidable in suitable ways in the saddle. The knee, saddle and table together provide relative adjustment giving table movement in three transverse paths whereby work supported on table 6 may be moved in any one of such paths relative to a cutting tool supported and driven from spindle 3 in the usual manner.

*Spindle drive transmission.*

A driving train is provided for rotation of spindle 3 from pulley 2 as follows.

Pulley 2 is fixed on a shaft 7ᵇ rotatably supported in a bore 8ᵇ of a bracket 8 fixed on column 1. Fixed on shaft 7ᵇ inside the column is a clutch member 7 having a tapered bore for frictional engagement by a complementary surface on a clutch member 9 slidably keyed on a shaft 10 rotatably supported in axial alignment with shaft 7ᵇ. The clutch member 9 may be moved in the one direction to engage with the clutch member 7 or may be moved in the other direction to disengage therefrom, by the means of a hand lever 11. Lever 11 is fixed on a shaft 12 pivoted in column 1 which carries a lever 13 fixed on the shaft inside the column. A rod 14 is in pivoted engagement with lever 13 and also with a fork member 15 pivoted on a pin 16 and provided with a pivoted shoe 17 engaging an annular groove 9ᵇ in the clutch member 9.

When member 9 is engaged to be driven from pulley 2 the shaft 10 is driven thereby. Slidably keyed on shaft 10 are the gears 18ª, 18ᵇ, 18ᶜ fixed together for engagement one at a time with complementary gears 19ª, 19ᵇ, and 19ᶜ fixed on a shaft 20 rotatably supported in column 1. The series of gears 18ª, 18ᵇ, 18ᶜ may be moved for engagement as described by the means of a hand lever 21 fixed on a shaft 22 pivoted in column 1, which carries an inner lever 23 having a pivoted fork member 24 engaging with the sides of the gear 18ᵇ. The several gear pairs which may be thus engaged are of different ratio and constitute a speed change mechanism whereby different speeds may be transmitted to the shaft 20 and thence to spindle 3 through a pinion 25 fixed on or integral with shaft 20 and meshed with a gear 26 fixed on spindle 3.

*Feed transmission.*

Figure 16:
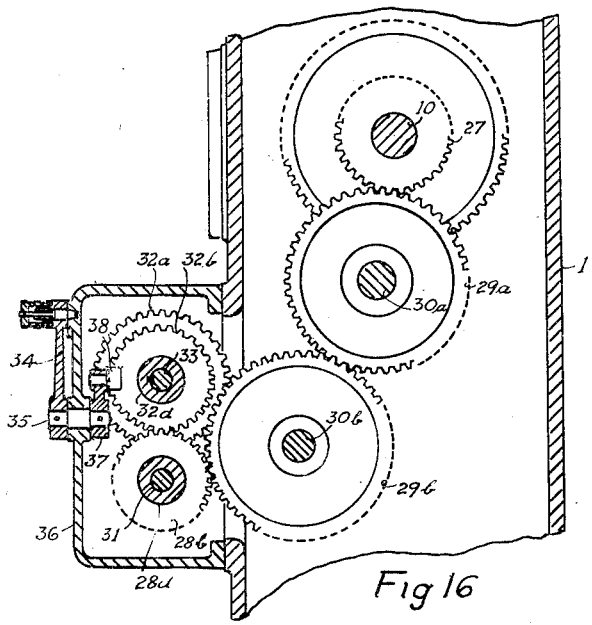
Fig. 16 is a partial vertical section through the column taken along line 16—16 of Fig 1 and enlarged.
Figure 15:
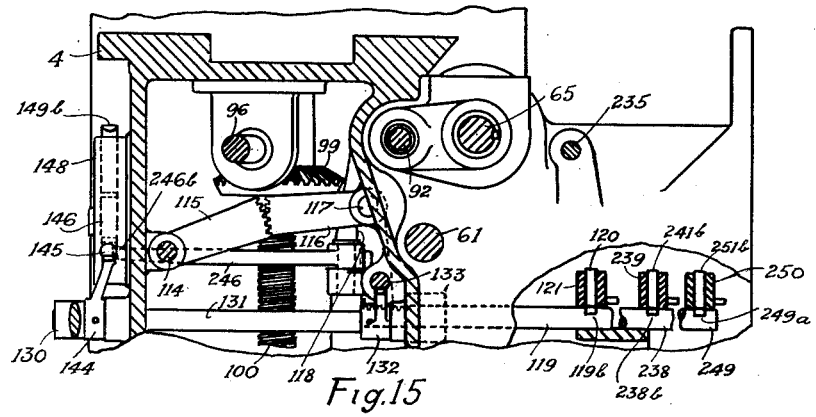
Fig. 15 is a partial vertical section through the knee taken along line 15—15 of Fig. 3.
Figure 5:
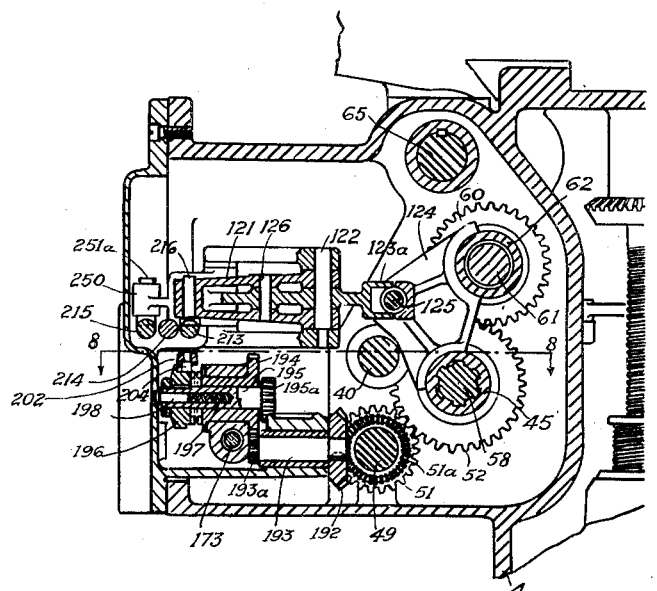
Fig. 5 is a partial vertical section along line 5—5 of Fig. 3 viewed from the rear.
Figure 7:
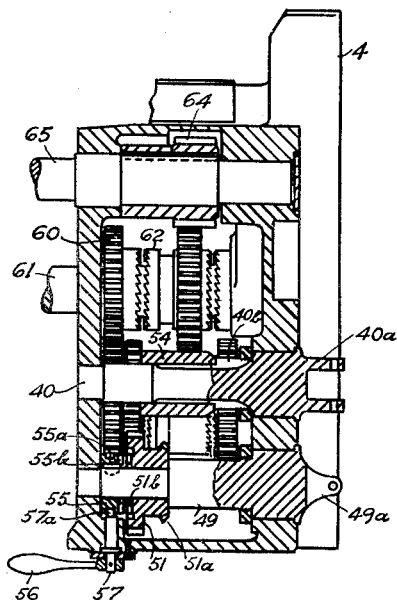
Fig. 7 is an enlarged vertical section of a portion of the mechanism in the rear of the knee taken along line 7—7 of Fig. 2.

A feed transmission including a feed rate change mechanism is provided and arranged to be driven through the clutch member 9 being therefore operative whenever spindle 3 is driven. The feed transmission is as follows. Fixed on shaft 10 is a gear 27 (see Figs. 1 and 16). Gear 27 drives a gear 28ᵇ through the idlers 29ᵇ and 29ᵃ, respectively rotatable on studs 30ᵇ and 30ᵃ fixed in column 1. Gear 28ᵇ is fixed on sleeve 28ᵈ freely rotatable on a shaft 31, and spaced apart but fixed for rotation together with sleeve 28ᵈ are other gears of different diameters 28ᵃ and 28ᶜ. Fixed on a sleeve 32ᵈ slidably keyed on a shaft 33 are complementary gears 32ᵃ, 32ᵇ, 32ᶜ respectively adapted to mesh one at a time with the gears 28ᵃ, 28ᵇ, 28ᶜ as the sleeve is moved in the one or the other direction by the means of a hand lever 34 fixed on a shaft 35 pivoted in housing 36 and having a lever 37 fixed thereon and carrying a pivoted fork member 38 engaging with the sides of the gear 32ᵇ. The shaft 33 may thus be driven at several different speeds in accordance with the setting of lever 34, the arrangement providing a feed rate change mechanism. Fixed on the shaft 33 is a driving member 39 and fixed on or integral with a shaft 40 (see Fig. 7) rotatably supported for movement with knee 4 is a driven member 40ᵃ, the driving and driven members being connected for actuation of the member 40ᵃ by the means of an extensible universal joint shaft of well known type, shown in Fig. 1 and there denoted generally by the numeral 41, whereby the shaft 40 will be actuated in any position of the movement of the knee 4. Fixed on or integral with shaft 40 is a pinion 40ᵇ (see Figs. 6 and 7) which is meshed with a gear 42 rotatably supported in the knee 4 and having fixed for rotation therewith a gear 43 meshing with gear 44 with which is fixed for rotation a clutch member 44ᵇ.

The gear 42 is provided with clutch teeth 42ᵃ and clutch member 44ᵇ is provided with clutch teeth 44ᵃ which are utilized to provide a feed drive for transmission mechanism to be later described whereby feed motion may be applied to the knee, table or saddle. By the mechanism above described the feed clutch elements 42ᵃ and 44ᵃ will be rotated whenever spindle 3 is rotated, by the means of power derived from the drive pulley 2 and at a predetermined one of several feed rates in accordance with the setting of the feed rate change mechanism.

*Quick traverse transmission.*

A hub 2ᵇ on the drive pulley 2 (see Fig. 1) is provided with a belt groove 2ᵃ, and a pulley 46 is fixed on a shaft 31 rotatably supported to be driven by a belt 47 engaging pulley 46 and the groove 2ᵃ. Fixed upon or integral with shaft 31 is a member 48 and fixed upon or integral with a shaft 49 (see Fig. 7) supported in knee 4 is a driven member 49ᵃ. The parts 48 and 49ᵃ are the driving and driven elements of an extensible universal joint shaft of well known construction generally denoted by the numeral 50 in Fig. 1, whereby shaft 49 may be driven in any of the positions of adjustment of knee 4. Rotatably supported on shaft 49 is a gear 51 meshing with a gear 52 (see Figs. 6 and 7) supported by, but free to rotate upon the extended hub of a gear 53, being prevented from axial movement in the one direction by the gear 53 and in the other direction by a sleeve 54 fixed on the shaft 40 the sleeve being of suitable diameter and length for this purpose. The gear 51 is provided with clutch teeth 51ᵇ and slidably keyed on the shaft 49 is a clutch member 55 having complementary clutch teeth 55ᵇ adapted for engagement to drive the clutch 51ᵇ and the gear 51. The member 55 is movable into and out of such driving engagement by the means of a hand lever 56 pivoted on a short shaft 57, having an eccentris portion 57ᵃ projecting into an annular groove 55ᵃ of the member 55. The arrangement provides that as the handle 56 is turned in the one direction the member 55 will be engaged to drive the gear 51, this being the normal operating position, but when the handle 56 is moved in the other direction the clutch member 55 will be disengaged and gear 51 will not be driven. Gear 52 is provided with clutch teeth 52ᵃ which are used to actuate the table, knee and saddle transmissions to be later described.

The quick traverse clutch element 52ᵃ it will be noted, is power operated at a constant rate whenever the pulley 2 is rotated, if the clutch member 55 is engaged as described.

*Feed and quick traverse transmission to the table.*

Figure 23:
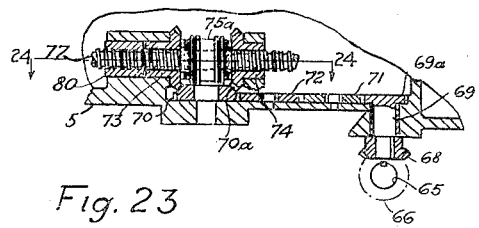
Fig. 23 is a development of gearing along line 23—23 of Fig. 22.
Figure 24:
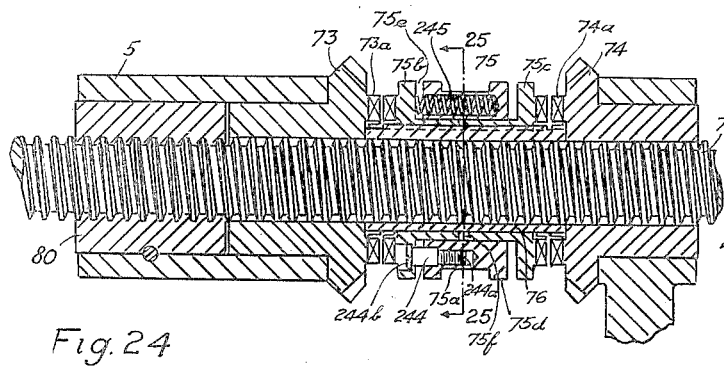
Fig. 24 is an enlarged horizontal section along line 24—24 of Fig. 23.

Transmission mechanism is provided for the power movement of the table 6 in either direction and either at a variable feed rate from the feed transmission previously described, or at a constant rapid traverse rate from the rapid traverse transmission previously described as follows: Gear 53 (see Figs. 6 and 7) is fixed upon a shaft 58 rotatably supported at the one end in a sutiable bearing in the knee structure and at the other end in a suitable bushing 59 in an axial bore of the gear 42 whereby gear 53 is driven whenever the shaft 58 is driven. Gear 53 meshes with a gear 60 fixed on shaft 61 and which is provided with clutch teeth 60a. Interposed between the clutch teeth 42a and 52a is a clutch member 45 slidably splined on shaft 58, having at opposite ends clutch teeth respectively complementary to the clutch teeth 42a and 52a and adapted to be shifted in opposite directions to engage the respective clutch teeth. A clutch member 62 is rotatably and slidably supported on a sleeve 63 on shaft 61 and is interposed between clutch teeth 60a and 44a and provided on its opposite ends with complementary clutch teeth adapted to engage with the clutch teeth 44a and 60a when the member 62 is shifted in opposite directions. The clutch member 45 and clutch member 62 are connected for simultaneous shifting movement in the same direction as will be later explained, and when shifted to the left in Fig. 6 clutch member 45 will engage with clutch teeth 52a whereby shaft 58, gear 53 and gear 60 will be driven at a rapid traverse rate and will drive the clutch member 62, which has been shifted into engagement with the clutch teeth 60a at the same time that the clutch member 45 was shifted, at a quick traverse rate. When the clutch members 45 and 62 are shifted in the opposite direction, that is to say to the right in Fig. 6, the clutch teeth at opposite end of clutch member 62 will be engaged with the clutch teeth 44a whereby member 62 will be driven at a feed rate. It will thus be seen that the member 62 may be driven either at a quick traverse rate or at a feed rate according as it is shifted in the one or the other direction together with member 45. Fixed upon or integral with the clutch member 62 is a gear 62b permanently meshed with a gear 64 fixed upon a shaft 65 (see Figs. 1—7—23) rotatably supported in the knee 4. Shaft 65 extends toward the front along the side of the knee 4, and drives a bevel gear 66 slidably splined thereon and supported in a bracket 67 fixed on a saddle 5, gear 66 being movable with the saddle in its movement in and out on the knee 4. Meshing with gear 66 is a bevel gear 68 fixed on a short shaft 69 rotatably supported in the saddle 5 and having fixed upon or integral with the upper end thereof a gear 69a from which motion is transmitted to a gear 70 through idlers 71 and 72 rotatably supported in the saddle. Fixed on the gear 70 is a bevel gear 70a and rotatably supported in saddle 5 are the bevel gears 73 and 74 engaged with the gear 70a to be oppositely rotated whenever gear 70a is rotated (see Figs. 22, 23, 24, etc). The gears 73 and 74 are respectively provided with the clutch teeth 73a and 74a and interposed between the gears is a clutch member generally denoted by the numeral 75 having at its opposite ends clutch teeth complementary to the clutch teeth of the bevel gears and adapted to be shifted in opposite directions to be oppositely driven by the one or the other of the bevel gears. Clutch member 75 is slidably splined on a sleeve 76 in an axial bore of which a screw 77 is slidably splined.

The screw 77 is rotatably supported in brackets 78—79 (see Fig. 2) fixed on the table 6, but is fixed against axial movement relative to the table, and is in threaded engagement with a nut 80 fixed in a saddle 5, whereby the screw is advanced in the one or the other direction according to the direction of its rotation and when so advanced table 6 is forced to move with the screw.

By the above mechanism the table 6 may be advanced in either direction in accordance with the position of the clutch member 75 and either at a feed or rapid traverse rate in accordance with the position of the clutch members 45 and 62.

*Feed and quick traverse transmission to saddle and knee.*

Figure 6:
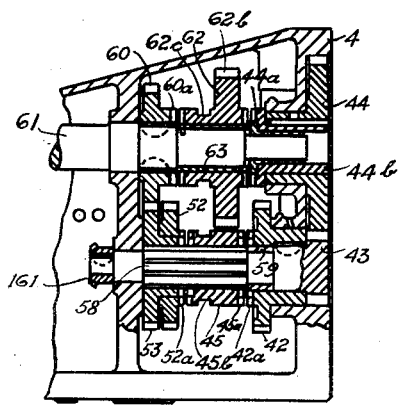
Fig. 6 is an enlarged vertical section of a portion of the mechanism in the rear of the knee taken on line 6—6 of Fig. 2.
Figure 14:
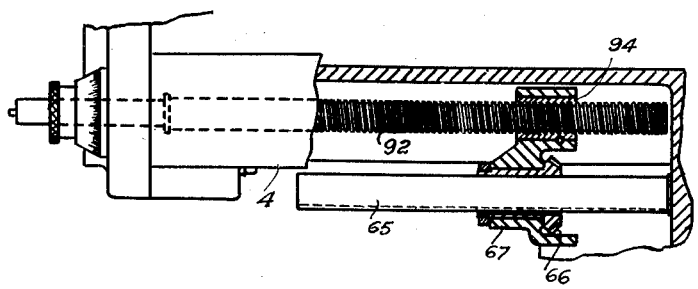
Fig. 14 is a partial horizontal section showing the cross feed screw and nut and a portion of an adjacent shaft. The view represents a portion taken along the line 3ª—3ª of Fig. 2, enlarged, and shows the rear end of the screw which is partly shown in Fig. 3.

It has previously been noted that the shaft 61 is actuated at a rapid traverse rate whenever the clutch members 45 and 62 are shifted to the left of Fig. 6. When the clutch members are oppositely shifted and the clutch teeth 42a are engaged by the complementary clutch teeth of the member 45, the shaft 58 will be driven at a feed rate whereby shaft 61 will likewise be driven at a feed rate. Shaft 61 extends to the front along the side of the knee (see Figs. 1—3—11—12, etc.) and slidably splined at the front end of the shaft 61 is a clutch member generally denoted in Fig. 12 by the numeral 81. Clutch member 81 is provided on its opposite ends with the clutch teeth 81b and 81c. Rotatably supported upon the shaft 61 and prevented from axial movement relative thereto are gears 82 and 83 at opposite ends of the clutch member 81 and provided with clutch teeth 82a and 83a complementary to the clutch teeth of the member 81 and respectively adapted to be engaged by the clutch teeth of the member 81 as the member is shifted in the one or the other of its directions of movement. When the clutch teeth 81c are shifted to engage the clutch teeth 83a, gear 83 will be actuated from the shaft 61 and will drive a shaft 84 through an idler 85 and a gear 84a fixed upon or integral with the shaft 84 whereby a gear 86 fixed on shaft 84 will be driven in the one direction. When the clutch teeth 81b are shifted to engage with the clutch teeth 82a, the gear 82 will drive gear 86 in the opposite direction being directly meshed therewith. The gear 86 may thus be driven in the one or the other direction in accordance with the direction in which the clutch member 81 is shifted and will then drive a gear 87 fixed on a shaft 88 and likewise gear 89 fixed on the same shaft. Meshing with gear 89 (see Fig. 3) is a saddle feed or cross feed gear 90 and likewise a vertical feed or knee feed gear 91. The gear 90 is rotatably supported on the cross feed screw 92 and is provided with clutch teeth 90ª. Slidably splined on the cross screw 92 is a clutch member 93 provided with clutch teeth 93ª complementary to the clutch teeth 90ª and adapted to engage therewith and be driven thereby when the member 93 is suitably shifted whereby the screw 92 will be driven. Screw 92 is rotatably supported at the one end in a suitable bearing in the knee 4 but fixed against axial movement relative thereto and is in threaded engagement with a nut 94 fixed in the bracket 67 attached to the saddle 5 as previously mentioned, whereby when the screw is rotated in the one or other direction, the bracket 67 together with the saddle 5 will be traversed in or out on the knee 4. It will thus be seen that the saddle 5 may be connected for power movement if the clutch 93 is suitably shifted, and if so connected may be traversed in one or the other direction in accordance with the position of the clutch member 93 and at a feed or quick traverse rate in accordance with the position of the clutch members 45 and 62.

Figure 17:
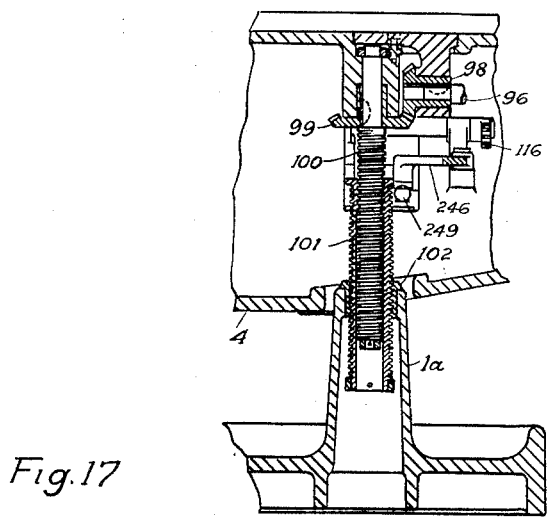
Fig. 17 is a partial vertical section through the knee and the base of the column showing the knee elevating screws and gears. This section is taken along line 17—17 of Fig. 3.

The vertical feed gear 91 is rotatably supported on the outside diameter of a sleeve 95 (see Fig. 3) in the axial bore of which is supported a shaft 96. Gear 91 is provided with clutch teeth 91ª and a clutch member 97 slidably splined on shaft 96 is provided with complementary clutch teeth 97ª adapted for engagement to be driven from the clutch teeth 91ª when member 97 is shifted in the proper direction, whereby shaft 96 will be driven. At the rear end shaft 96 is fixed in the extended hub of the bevel gear 98 rotatably supported in the knee 4 and meshing with a bevel gear 99 (see Figs. 3 and 17) fixed on the screw 100 rotatably supported in knee 4. The screw 100 is the inner member of a collapsible or telescopic screw of which a screw 101 is the outer member. The detailed construction of collapsible screws for similar use is a matter of common knowledge and for this reason will not be here described. The screw 101 is in threaded engagement with nut 102 fixed in the extension 1ª of the base of column 1 by the described construction. The knee may be moved by power on the column 1 in the case that the clutch member 97 is suitably shifted and in either direction in accordance with the position of the clutch member 97 and at a feed or quick traverse rate in accordance with the position of the clutch members 45 and 62.

Because of the relatively heavy weight to be moved when the knee is moved, and because of the relatively short movement of the saddle, the rapid traverse movement of the knee and saddle is less than for the table, although the feed movement for any given setting of the feed rate change gearing is the same for the knee, saddle and table. This is accomplished in the particular embodiment here disclosed by making the gears 43 and 44 which are used only to transmit the feed to the table, of different ratio than the gears 53 and 60, which are used to transmit feed motion to the knee and saddle. Then, in order to give equal feed movement to the several supports, the remainder of the respective trains, that is to say the train leading from gear 60 to the knee and saddle, and the train leading from gear 60 to the table, are of correspondingly different ratio. It is to such remaining train portions that the power rapid traverse is applied through the gears 53 and 60 when clutch members 45 and 62 are suitably shifted, and since such portions are of different ratio the resulting quick traverse rate is different as above noted. In the present instance the difference in rapid traverse rate is substantial, as indicated by the difference in diameter of the respective gears of the pair 43 and 44, as compared with the gear pair 53 and 60.

*Manual adjustment of table, saddle and knee.*

Figure 19:
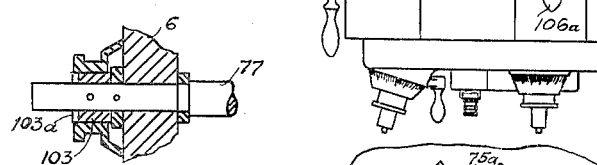
Fig. 19 is a portion of the end of the table screw.

The table, saddle and knee are each provided with means for manual adjustment as follows: The table screw 77 is provided at each end with a clutch member. The construction is similar for both ends and is shown for the left hand clutch member in Fig. 19. Clutch member 103 is fixed upon the screw 77 and provided with clutch teeth 103ª adapted to be engaged by a hand crank not shown having suitable complementary clutch teeth.

The saddle screw 92 has fixed on its front end clutch member 104 (see Fig. 3) provided with clutch teeth 104ª adapted for engagement by complementary clutch teeth on a suitable hand crank. The shaft 96 connected for movement of the knee screw, is provided at its front end (see Fig. 3) with clutch member 105 having clutch teeth 105ª which may be engaged by complementary clutch teeth on a suitable hand crank.

It will thus be seen that either the knee, table or saddle may be manually moved in case the previously described power transmission is disconnected.

*Manual control of support transmissions.*

The transmission mechanism previously described for the knee, table and saddle is provided with means for complete manual control. The control for the table movement is as follows: Clutch member 75 together with the associated members constitutes a reverser the member 75 being movable in the one or other direction, to effect reversal by means of a hand lever 106, fixed on the upper end of a shaft 107 (see Figs. 1–22, etc.). At the lower end of shaft 107 is fixed a segment 107ª engaging with the one arm of a lever 108 pivoted on a pin 109 and having an oppositely extending arm provided with gear teeth engaging a suitable pinion 110. Pinion 110 is engaged with suitable rack teeth on a rod 111 which is provided at one end with a fork 112 fixed thereon and extended to engage with an annular groove 75ª in the clutch member 75. By the mechanism described, the clutch member 75 may be shifted in either direction in accordance with the manual movement of the lever 106 to cause the table 6 to move in opposite directions.

A lever 113 may be shifted in the opposite direction for the shifting of the clutch members 45 and 62 for controlling rapid traverse movement. Lever 113 (see Figs. 2, 3, and 15) is fixed on shaft 114 pivoted in the knee 4 and having fixed at the rear end thereof a segment 115 meshing with segment 116 fixed upon a shaft 117. Shaft 117 is provided with segment 118 extending downwardly to engage with suitable rack teeth 119ª of a shaft or rod 119 slidably supported in the knee and having a slot 119ᵇ engaged by a shoe 120 pivoted in an arm of a lever 121 pivoted on pin 122. Likewise pivoted on pin 122 is a lever 123 having an arm 123ª extended to engage a suitable slot in a shifter fork 124 slidable on shaft 125 and having portions extended to engage both with the annular groove 62ᶜ of the clutch member 62 and with the annular groove 45ᵇ of the clutch member 45 as particularly shown in Figs. 3, 5, and 6. The lever 123 is connected for movement with the lever 121 by means of a pin 126 fixed in the lever 121 and engaged by an elongated lost motion slot 123ᵇ in an arm of the lever 123 which is also provided with arrow shaped cam portion 123ᶜ engaged by a portion 127ª of a lever 127 pivoted on a pin 128 and strongly pulled by a spring 129. The described arrangement is such that as the lever 121 is moved in the one or the other direction from the hand lever 113 the pin 126 will eventually contact and move the lever 123 in spite of the lost motion in the slot 123ᵇ thereby shifting the fork 124 in the one or the other direction whereby the clutch members 62 and 45 are simultaneously moved in a direction to engage with the feed or quick traverse both for the table, saddle and knee. Because of the lost motion slot 123ᵇ the lever 121 in either direction of its movement will move a certain distance before the lever 123 is moved, following which the lever 123 will be moved against the resistance of the spring pressed lever 127 and before the time that the clutch members 62 and 45 move out of engagement the point of the portion 123ᶜ will have moved past the point of the portion 127ª so that immediately after the disengagement the spring 129 will cause opposite engagement of the clutch members irrespective of the further movement of lever 113, the lost motion 123ᵇ being sufficient to permit such opposite engagement. Owing to the arrangement as described, in either direction of travel, the lost motion always stands in a position to permit the action as described. If for any reason the spring should fail to move the clutch members into opposite engagement the continued movement of the lever 113 would eventually bring about this result, but it is desirable that the engagement of the clutch members should ordinarily take place very quickly and it is for this and other reasons that the lost motion and associated mechanism is incorporated.

The reverser consisting of the clutch member 81 together with associated gearing may be manually shifted in the one or the other direction by means of a hand lever 130 fixed on a shaft 131 (see Figs. 1, 3, 12, 15, 18). A segment 132 fixed thereon engages with suitable rack teeth in sliding shaft or rod 133 upon which is fixed a fork 134 engaging with an annular slot 81ᶜ in the clutch member 81. Thus when lever 130 is shifted in one or the other direction the reverser clutch member 81 may be engaged to drive the gear 82 or gear 83.

The clutch members 93 and 97 are interconnected for engagement one at a time and are movable from a hand lever 135 (see Figs. 2, 3, 13,) mounted on a short shaft 136 provided with a bevel segment 136ª meshing with bevel segment 137. On the vertical shaft 137ª is fixed a lever 138 the oppositely extending arms of which are provided with portions 138ª and 138ᵇ respectively engaging with suitable annular grooves in clutch members 93 and 97. Lever 135 is provided with a spring pressed plunger 139 and a hand grip 140 whereby plunger 139 may be withdrawn against resistance of the spring, there being suitable holes 139ª provided for plunger 139 to define the position of the lever when the respective clutches are engaged. The arrangement is such that as the lever is shifted in one direction the one clutch is engaged and the other is thereby disengaged, whereby only one of the clutch members 93 and 97 may be engaged at a time.

Thus by the above mechanism complete manual control is had for the power movements of the knee, saddle and table whereby the transmission mechanism described may be caused to move them in either direction of their movement and either at a feed or quick traverse rate, or such motion having been manually established may be manually interrupted.

*Trips movable from support movement.*

The power movement of the knee, table, or saddle having been established, either by the manual control lever previously described or by other control mechanism to be later described, may be interrupted or tripped from the movement of the respective supports by the following mechanism.

Figure 2:
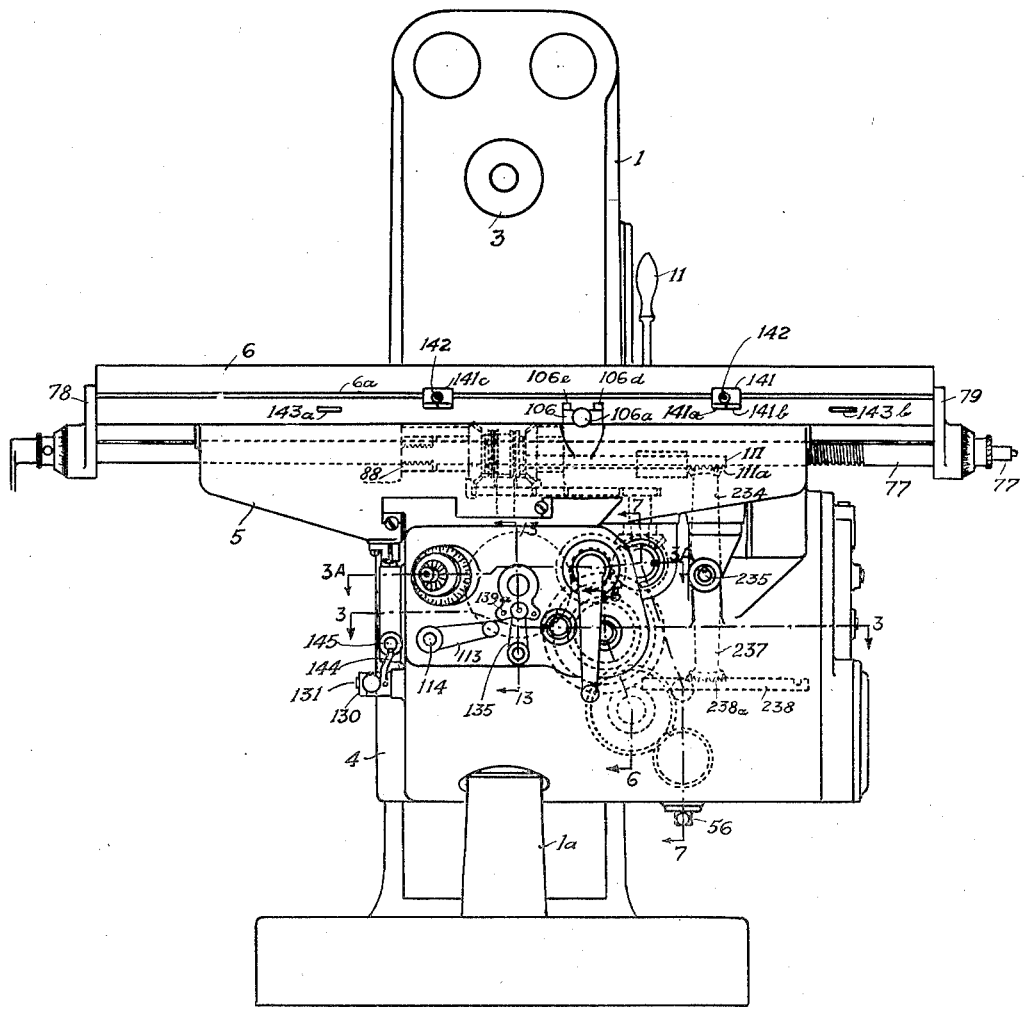
Fig. 2 is a front elevation of the machine.
Figure 3:
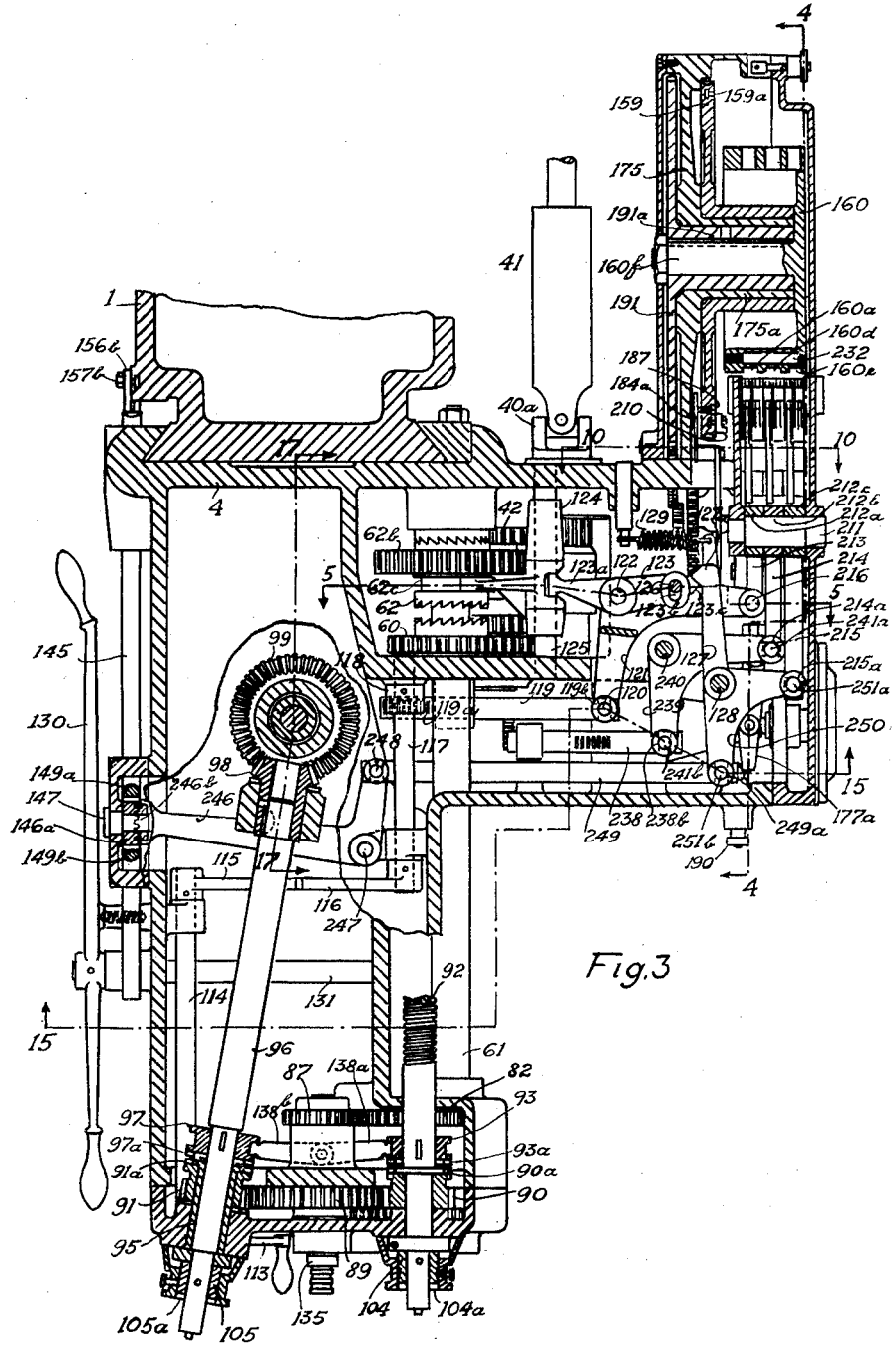
Fig. 3 is a horizontal enlarged section taken along line 3—3 of Fig. 2 as to the rear part and along line 3A—3A of Fig. 2 as to the front part, the column mechanism being largely broken away.
Figure 18:
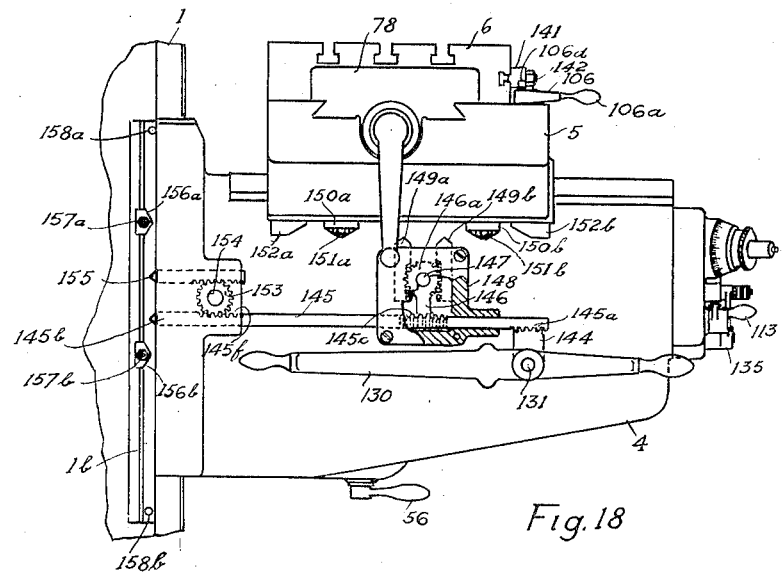
Fig. 18 is a left side elevation of the knee, saddle and table showing some of the tripping mechanism associated therewith.
Figure 22:
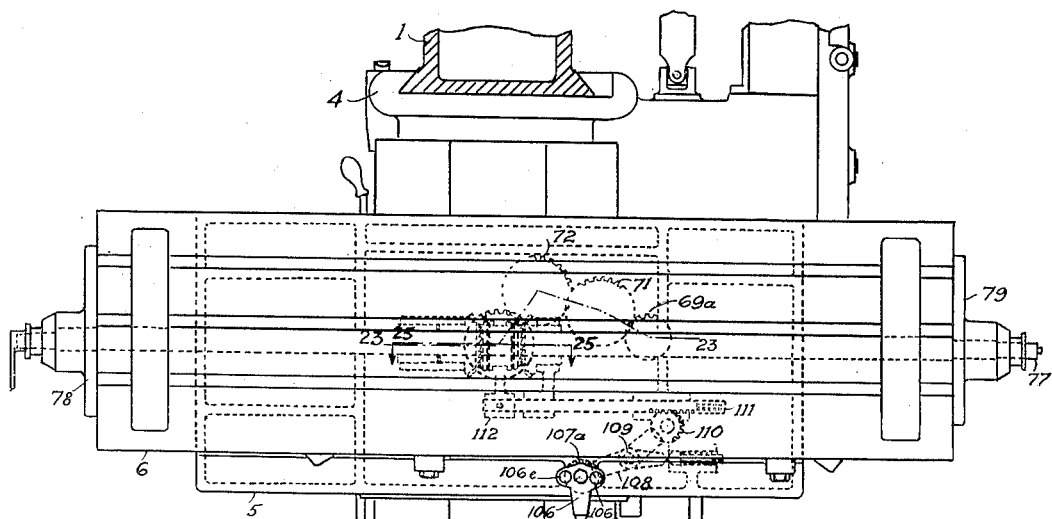
Fig. 22 is a plan view of the knee, saddle and table the rear portion of the machine being broken away.

For tripping the table, the lever 106, which is connected for movement with reverser member 75 is provided at its upper end with contact pins or elements 106$^d$ and 106$^e$ (see Figs. 2, 18 and 22). A dog 141 adjustably fixed on the table 6 by the means of a T slot 6$^a$ and a T bolt 142 is provided with angular faces 141$^a$ and 141$^b$ of suitable position and dimensions. The relationship of the parts is such that when the handle portion 106$^a$ of lever 106 is moved to the right in Figs. 2 and 22 the table travels to the left, the pin 106$^d$ being thereby moved in toward the table edge. In the continued motion of the table, angular surface 141$^a$ of dog 141 will eventually contact the pin and move it back to the position shown in Fig. 22, which corresponds to the neutral or non-power-transmitting position of the reverser clutch member 75 and the table motion is thereby interrupted. If it were desired to move the table to the right a dog 141$^c$ the same or similar to dog 141 is then positioned to the left of the lever 106. Movement of lever 106 to the left moves clutch member 75 to a position productive of right hand table movement and swings pin 106$^e$ to a position to be eventually contacted by the dog in the continued movement of the table, although it is now the surface 141$^b$ of the dog which contacts the pin, whereupon the pin 106$^e$ is forced back to interrupt the table movement as before. Thus the lever 106 in effect constitutes a trip post, which in combination with adjustable table dogs as described may interrupt the table movement at any desired point. To prevent table movement being continued indefinitely in either direction in the absence of dogs 141 or 141$^c$, positive trip dogs 143$^a$ and 143$^b$ are permanently fixed with the table and will eventually contact a lower portion of the pins 106$^d$ and 106$^e$ respectively, as the table moves to left or right. The positive trip dogs are positioned to contact the pins and disengage or interrupt the power movement before the table moves sufficiently far to cause damage to the mechanism.

To disengage the reverser clutch member 81 either from the movement of the saddle 5 in the case that the clutch member 93 is engaged to drive the saddle, or from the movement of knee 4 in the case that clutch member 97 is engaged to drive the knee the following mechanism is provided.

The shaft 131 which is movable with member 81 as previously described, is provided with a segment 144 (see Figs. 2, 3, and 18) engaged by rack teeth 145$^a$ in a rod 145. Rod 145 is extended to the rear and terminates in an end 145$^b$ having angular faces. Rack teeth 145$^c$ are cut on an intermediate portion and are engaged by a segment 146 pivoted on a stud 147 supported in bracket 148 fixed on the knee and having a gear portion 146$^a$ which engages on the opposite sides of its periphery with suitable rack teeth in the pins 149$^a$ and 149$^b$. By the described connecting mechanism when the shaft 131 is moved by handle 130 or otherwise as will later be described, to engage the reverser member 81 in the one or the other directions, the one or the other of the pins 149$^a$, 149$^b$ are moved upwardly. If the clutch member 93 is engaged to cause saddle 5 to move, the pin which has moved upwardly will eventually be contacted by the one or the other of adjustable dogs 150$^a$ or 150$^b$ the angular face portions of which as shown in Fig. 18 are so positioned and of such dimensions as to effect such contact and force the pin back in the continued motion of saddle 5. This action will take place in either direction of the motion of saddle 5 and at any point therein according to the position of the adjustable dogs. A T slot, not shown, and T bolts 151$^a$ and 151$^b$ are utilized for clamping the dogs in the various positions of dog adjustment. Forcing back the upstanding pin moves shaft 131 and the reverser clutch member 81 back to the neutral position from which it has been previously moved and stops the saddle movement. Positive or limit stops 152$^a$ and 152$^b$ are permanently fixed on the saddle 5, and in the absence of the dogs 150$^a$ or 150$^b$ will trip the saddle movement at the limit of its movement in either direction, being positioned and of such dimensions as to eventually contact and shove back the pins 149$^a$ or 149$^b$, should either pin be raised by the engagement of the reverser clutch and such contact taking place before the limit of saddle movement has been reached.

The extended rod 145 is provided with rack teeth 145$^f$ engaged by a gear 153 pivoted on a stud 154 fixed in knee 4, and engaging with suitable rack teeth in a sliding pin 155. The arrangement is such that when hand lever 130 is moved to engage reverser clutch member 81 in the one or the other direction, either the rod end 145$^b$ or the rod 155 will be moved to the rear. Dogs 156$^a$ and 156$^b$ are adjustably clamped by the means of a T slot 1$^b$ and T bolts 157$^a$, 157$^b$ and are of such position and dimensions as to contact the end thus moved to the rear and force it back again as the knee 4 is moved by the previously described transmission mechanism, thus forcing the clutch member 81 to a neutral position and interrupting the drive and stopping the knee movement. By suitably positioning the dogs such interruption may be caused to take place at any point in the movement of the knee. In the absence of either or both of the dogs 156$^a$, 156$^b$, positive stops or trips 158$^a$, 158$^b$ are fixed on the column 1 and are of such dimensions and position as to contact and force back the trip pins 145$^b$ or 155 before the knee has moved to the extreme limit of its travel in the one or the other direction.

It will thus be seen that either the knee, the table or the saddle may be interrupted in their power movement by the means of adjustable dogs at any point in either direction of their travel, and should the operator have failed to suitably position such adjustable dogs, other dogs are provided in each instance to positively interrupt the transmission train before the moving support has reached the limits of its travel in either direction, the power for the clutch movement necessary to bring about such interruption being supplied through the transmission train which actuates the member.

Other control mechanism.

Other control and trip mechanism is provided for the shifting of the reverser member 75, the reverser member 81 and also for the shifting of the clutch members 45 and 62 which control the effect of the feed and quick traverse transmissions.

This mechanism includes a timer member 159, which is given a power movement and controls by virtue of dogs adjustable thereon the time at which a shifter member 160 is moved to move one or more of the clutch members to be shifted. The shifter member 160 is given a power movement at intervals controlled by the timer member 159 and controls or determines, in accordance with the presence or absence of removable dogs thereon the movement of the clutch member or members which are to be shifted in the various support trains, all of which will now be described.

Drive and control for timer member 159.

The timer member 159 (see Figs. 3, 4, 20, 20A etc.) is actuated from a bevel gear 161 fixed on the extended end of the shaft 58 (see Figs. 6 and 9) and meshed with a bevel gear 162 fixed on one end of a shaft 163 rotatably supported from knee 4 and having at its other end a clutch member 164 fixed thereon. A shaft 165 is rotatably supported in axial alignment with shaft 163 and slidably keyed thereon is a shiftable clutch member 166. The clutch members 164 and 166 have complementary clutch teeth whereby clutch member 166 and shaft 165 may be driven from shaft 163 if the member 166 is shifted in a direction to engage the complementary teeth. If the member 166 is shifted in the opposite direction the shaft 165 will not be driven. A shaft 167 is axially parallel with shaft 165 and is rotatably supported from knee 4, the shafts 165 and 167 having projecting end portions 165$^c$ and 167$^a$ upon which the gears 168 and 169 are removably splined, being retained in such position by a removable cover plate 170. Gears 168 and 169 are of different diameter and are removable to be reversed in position in the train or to be replaced by other gears of still different diameter, which may also be reversible in position, thus providing a simple but effective rate changer effective only upon timer member 159, whereby the time required for one revolution of the timer member may be changed over a comparatively large range for purposes which will be later disclosed. Fixed on shaft 167 is a bevel gear 171 meshing with a bevel gear 172 fixed on a shaft 173 (see Figs. 4 and 9) upon the rearward extension of which is a worm 174 either fixed upon or integral with the shaft. Worm 174 meshes with suitable worm gear teeth 159$^b$ cut on the periphery of the timer member 159, the timer member being rotatably supported on the outside diameter of a hub or extension 175$^a$ of a bracket or housing member 175 fixed on the knee, the timer member having a hub 159$^c$ extended and provided with an axial bore for this purpose.

By the means of the mechanism described the timer member 159 may be rotated at a feed rate or at a quick traverse rate to perform revolutions or cycles, even though the knee, table and saddle are not actuated. If any of them are actuated a change from feed to quick traverse or vice versa in the rate of any of them likewise changes the rate of the timer member 159 provided that the timer clutch members 164 and 166 are engaged to drive the timer. The rate of the timer member may also be still further changed by the rate change mechanism typified by the gears 168 and 169. The timer clutch members 164 and 166 are normally engaged by the means of a spring 176 (see Fig. 9, etc.) but the member 166 may be withdrawn from driving engagement against the pressure of spring 176 by means which will now be described.

A fork member 177 (see Fig. 4 etc.) is provided with pivoted shoes 178, engaging an annular groove 166$^a$ in the member 166. The one end of the member 177 is pivoted by the means of a pin 179 for movement with a lever 180 pivoted on a pin 181 fixed in the knee (see Figs. 4 and 8). A rod 182 is at the one end pivoted with an arm 180$^a$ of lever 180 by the means of a pivot pin 183 and at the other end is pivoted to a member 184 by the means of a pivot pin 185. Member 184 is pivoted on a pin 186 and is provided with a projecting end portion 184$^a$ (see also Fig. 20A). A screw 187 is removably threaded in the timer member 159 and has an end portion projecting to strike the projecting arm 184$^a$ during the revolution of the timer member. The fork member 177 is provided with an arm 177$^a$ which contacts with the angular face 188$^a$ of a plunger 188 which is pressed forward to a contact position by the means of a spring 189 but which may be partially withdrawn by the means of a knob or handle 190 fixed on the shank thereof. The plunger 188 provides, when pressed forward by spring 189 an abutment against which the arm 177$^a$ may react, and under such conditions the relationship of the parts described is such that when the projecting end 187ª of screw 187 strikes the arm 184ª, the clutch member 166 will be moved out of engagement against the pressure of spring 176 and the timer member 159 will then stop. This will invariably occur once for each revolution of the timer member 159 unless screw 187 is removed in which case the timer member will rotate continuously. When the timer member stops as described it may be started again by pulling out the plunger 188, the operator accomplishing this manually by the means of the knob or handle 190, in which case the plunger end no longer acts as an abutment for the form arm 177ª and the spring 176 is then free to thrust member 166 again into engagement. After such re-engagement the timer member 159 starts to move and soon thereafter the screw 187 has moved past the lever arm 184ª. After this happens the operator may release plunger 188 and the plunger again takes up its position ready to act as an abutment for the arm 177ª to trip out the clutch after the timer member has completed another revolution. As a matter of fact, springs 189 and 176 and the angle of the face 188ª are of such relative strength and proportion that after the plunger 188 has been manually withdrawn to start the timer in motion, it may be immediately released, without spring 189 overcoming spring 176, whereby plunger 188 will remain in its out position until the end of screw 187 has moved past the lever arm, after which since all resistance is removed the plunger 188 will move in under the pressure of spring 189.

*Drive and control for shifter member 160.*

The shifter member 160 is rotatably supported from the housing 175 fixed on knee 4, being integral with or fixed upon a shank 160ᶠ (see Figs. 3 and 20A) which in turn is fixed in an axial bore of the shank or hub 191ª of a gear 191. The shank 191ª is rotatably supported in a suitable bore of the hub or boss 175ª of the housing 175. The gear 191 and shifter member 160 are actuated at intervals from a bevel gear 51ª (see Figs. 5, 7, 20) fixed on or integral with the gear 51. Gear 51ª rotates at a constant rate whenever the clutch member 55 is engaged to drive gear 51ª as previously described. Meshing with gear 51ª is a bevel gear 192 (see Figs. 5, 20, 20A, etc.) fixed on a short shaft 193 rotatably supported from the knee 4 and having fixed upon or integral therewith a pinion 193ª meshing with a gear 194 rotatably supported by the means of an extended hub or shank portion 194ª which upon its one end is provided with clutch teeth 194ᵇ. Slidably supported in an axial bore of the hub 194ª is a shaft 195 which is free to rotate therein except as later described. Fixed upon one end of shaft 195 is a cam clutch member 196 having clutch teeth 196ᵇ complementary to the clutch teeth 194ᵇ.

The shaft 195 together with the clutch member 196 is thrust in a direction to engage the complementary clutch teeth by the means of a spring 197 which at the one end reacts directly against the end of a bore in the shaft and at the other end against a rod or member 198 having a seat or thrust bearing against a member 199 fixed in a wall of the housing 175. Thus, unless otherwise prevented, as is later disclosed, the member 196 will engage and be driven from the clutch teeth 194ᵇ. A pinion 195ª fixed upon or integral with shaft 195 meshes with a gear 200 fixed on a rotatable shaft 201, the gear 200 in turn meshing with gear 191.

The clutch member 196 is controlled to engage clutch teeth 194ᵇ only at predetermined intervals and when engaged is later withdrawn after gear 191 and shifter member 159 have made a portion of a revolution as follows. A lever 202 (see Figs. 4 and 20, etc.) is pivoted on a pin or stud 203 which is fixed in housing 175. The one arm of lever 202 carries a pin 204 an end of which projects downwardly to engage a cam face 196ᶜ (see Figs. 20, 20A, 21A etc.) of the member 196, the lever being pulled in a direction to cause such engagement by the means of a spring 205. The cam face 196ᶜ is provided with an angular portion 196ª which in the rotation of the member 196 reacts against the pin 204 to disengage the clutch teeth of member 196 against the resistance of spring 197. Another arm 202ª of lever 202 is provided with a latch member 206 pivoted on a pin 207 fixed in the arm 202ª and normally pulled by a spring 208 to a position where a stop portion 206ª contacts a stop pin 209 fixed in the lever arm. The timer member 159 is provided with a T slot 159ª, and dogs of which dog 210 is representative, may be adjustably fixed at various points around the timer member by the means of T bolts provided with suitable nuts. Dogs 210 have an angular face portion 210ˣ, which in the revolution of the timer member will contact with a projecting portion 206ᶜ when the latch 206 is against stop pin 209 and the lever 202 is in the position where pin 204 engages the cam face 196ᶜ of member 196. When this occurs the latch 206 will swing against the resistance of spring 208, but since spring 208 is much weaker than spring 205 the lever 202 will not be moved until a portion 206ᵉ of the latch contacts the opposite side of pin 209 following which the continued motion of dog 210 moves lever 202 until pin 204 is moved out of engagement with the member 196, thus permitting the spring 197 to move the clutch teeth of member 196 into engagement with the clutch teeth 194ᵇ. Member 196 together with the shifter member 160 connected therewith then starts to move and soon thereafter a high portion 196ᵉ of the member 196 strikes the lever 202 at a point adjacent pin 204, the form of portion 196ᵉ being such that the lever is thereby moved an additional distance in the same direction as previously, and sufficient to cause the portion 206ᵉ to clear the point 210ᵃ of dog 210. Immediately this happens the spring 208 is free to pull the latch 206 back to cause portion 206ᵉ to stop against pin 209, such latch motion being sufficient to swing the latch portion 206ᵉ in back of dog 210 to permit the lever 202 to move back, which occurs as soon as the high portion 196ᵉ has rotated out of contact with the lever. Except for the angular raised portion 196ᵃ the cam face 196ᶜ is formed to permit the pin 204 to drop in at any point in the rotation of member 196, and immediately the high portion 196ᵉ has passed the lever this will occur, whereupon in the continued revolution of the member 196 the portion 196ᵃ will react against the pin to pull the member 196 out of clutch engagement against the resistance of spring 197 when the member 159 has completed one revolution and the rotation of member 196 together with shifter member 160 will stop.

The above described action may be caused to take place as often as may be desired during a revolution of timer member 159 in accordance with the number and position of the adjustable dogs 210, and each time such action occurs the shifter member is moved through a portion of a revolution corresponding to a single revolution of the member 196 and to the ratio of the gears 195ᵃ and 191. In this instance the gear 191 has thirteen times the number of teeth of the gear 195ᵃ and hence makes one-thirteenth of a revolution each time it is caused to be actuated by a dog on the timer member, although it is apparent that any other ratio might have been chosen for gears 195ᵃ and 191.

*Control of support movements from shifter member 160.*

Figure 4:
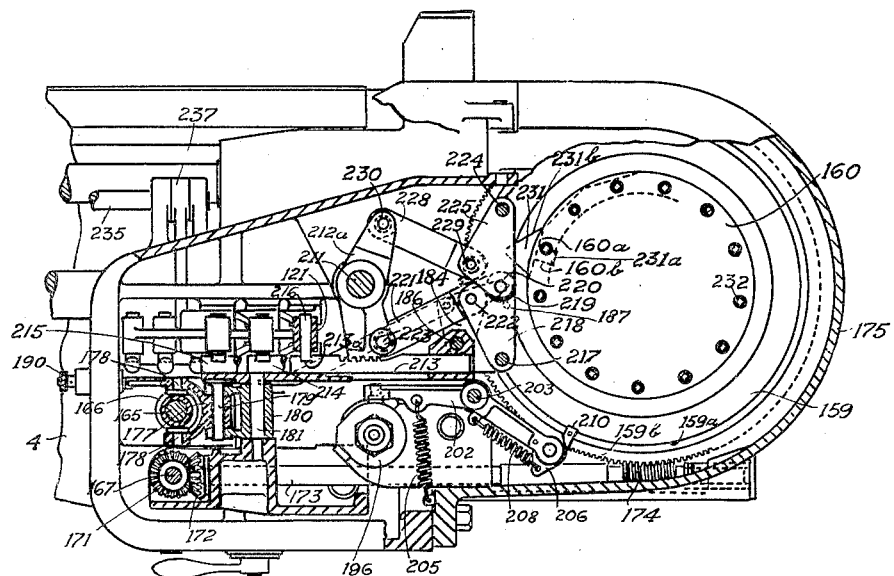
Fig. 4 is a vertical section taken along line 4—4 of Fig. 3 showing portions of the control mechanism.
Figure 26:
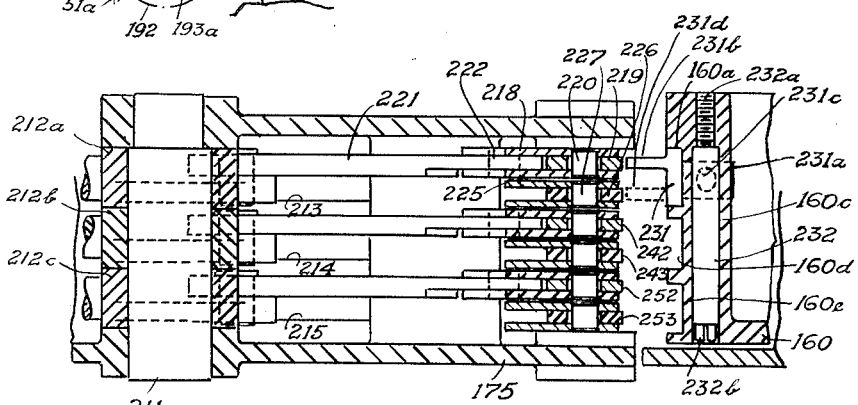
Fig. 26 is an enlarged section of part of Fig. 3.

Means are provided whereby the power movement of shifter member 160 may shift the various clutch members necessary to control the movement of the knee 4, saddle 5, and table 6 as follows:

Pivoted on a pin 211 fixed in housing 175 (see Figs. 3, 4, 26, etc.) are three levers 212ᵃ, 212ᵇ, 212ᶜ respectively having toothed arms engaging with rack teeth in underlying rods 213, 214, 215. In Fig. 4 a portion of each of rods 214 and 215 is broken away and the levers 212ᵇ and 212ᶜ are not shown in order to show more clearly the form of lever 212ᵃ and its engagement with its rod 213, the other levers and their engagement with their respective rods being exactly similar.

The rod 213 is provided with a slot 213ᵃ which is engaged by a pin 216 fixed in an arm of level 121, (see also Fig. 5) which as has been previously explained is connected for the movement of clutch members 45 and 62, whereby a shift of the lever 212ᵃ in the one or the other direction may shift the clutch members from a feed to a rapid traverse position or vice versa. To shift the lever 212ᵃ from the movement of shifter member 160 the following mechanism is provided. Pivoted on a pin 217 (see Figs. 3, 4, 10, 26) is a lever or member 218 provided with a roller 219 pivoted on a pin 220 fixed in the member 218. A rod 221 is connected at the one end with a lever 218 by the means of a pivot pin 222, and at the other end with lever 212ᵃ by the means of a pivot pin 223. Pivoted on a pin 224 is a lever member 225 provided with a roller 226 pivoted on a pin 227. A rod 228 is connected at the one end with member 225 by the means of a pivot pin 229, and at the other end with the lever 212ᵃ by the means of a pivot pin 230. The shifter member 160 is provided on its periphery with a series of configurations one of which is illustrated in Fig. 4 at 160ᵃ each being in the nature of a slot as more particularly shown in Fig. 26 and each having associated therewith a bore 160ᵇ adapted to receive a stem or shank 231ᵃ of suitable dogs typified by a dog 231, having a form adapted to fit closely in the slotted configurations 160ᵃ and having projecting portions as 231ᵇ. The dogs are retained in position by the means of pins associated with each configuration and typified by pin 232, the pin 232 being fitted closely in a bore 160ᶜ in the shifter member 160 and so positioned relative to the shank 231ᵃ that it engages the shank, a portion of the shank being cut away as at 231ᶜ so that when the shank is in position the cut away portion closely fits the pin 232, thus preventing removal or shifting of dog 231 until pin 232 is removed. Pin 232 is provided with a portion 232ᵃ threaded into a suitable bore in the shifter member and with a squared portion 232ᵇ adapted to receive a wrench or tool for turning the threaded portion into or out of engagement for removal of the pin. While the portion 231ᵇ is shown, in Fig. 26, as projecting into the path of movement of the roller 219, it is obvious that other similar dogs may have such portion projecting into the path of movement of roller 226. By the means of the motion transmitting connections described, whenever the clutch members 45 and 62 have been shifted by whatever means in the one or the other direction of engagement, the one or the other of rollers 219 or 226 will be moved toward the shifter member 160. A suitable dog 231 properly positioned on the shifter member may then move it back again through the action of the angular face 231ᵇ against the roller during the previously described power movement of the shifter member. The parts through which such clutch movement is effected include the lost motion slot 123ᵇ and pin 126 as has been previously described, and the action of the spring 129 and associated pivoted member 127 is to oppositely engage the clutch members by the means of the energy of the spring 129 precisely as previously described for the hand shifting of the members. It is therefore unnecessary and to a certain extent undesirable that the dogs 231 for movement of clutch members 45 and 62 should be of sufficient height in the portion 231$^b$ to force the clutch members into opposite engagement when moved, but only to shift the parts until spring 129 takes up and completes the movement. It is not contemplated that the clutch members 45 and 62 shall ever stand in a neutral disengaged or central position, and therefore the dogs for the shifting of these clutch members are of uniform height in the portion 231$^b$, sufficient as stated to move the parts to a point where the spring 129 continues the shifting movement to effect opposite engagement.

The rod 214 is connected for movement of table reverser clutch member 75 as follows. The shifter rod or bar 111, having motion transmitting connection with member 75 as previously described is extended and provided with rack teeth 111$^a$ (see Figs. 1, 2, 22, etc.) with which suitable gear teeth on a segment or lever 234 are engaged. Lever 234 is slidably keyed on a shaft or rod 235 fixed against axial movement and supported at the one end in the knee 4, the other end underlying saddle 5 and being supported therefrom in a bracket 236 fixed thereon which also provides suitable cheeks or bosses between which the lever 234 is constrained for movement with the saddle, the arrangement being such that a motion transmitting relationship is preserved in any position of the movement of saddle 5. Fixed on rod 235 is a downwardly projecting segment or lever 237 provided with gear teeth engaging with suitable rack teeth 238$^a$ in a slidable bar or rod 238 supported from knee 4. A lever 239 is pivoted on a pin 240 supported from knee 4, and is provided at the one end with a pivoted shoe 241$^a$ engaging with a suitable slot 214$^a$ in the rod 214 and at the other end with a pivoted shoe 241$^b$ engaging with a suitable slot 238$^b$ in the rod 239. By the above described motion transmitting connections the clutch member 75 is shifted in accordance with the movement of the rod 214. Rod 214 is connected for movement with rollers 242 and 243 by the means of a lever 212$^b$ pivoted on pin 211 and having motion transmitting connection with both of the rollers in a manner and by the means of members precisely similar to those previously described to connect the rod 213 with the rollers 219 and 226. The shifter member 160 is provided with a series of slotted configurations similar to the slots 160$^a$, one of which is represented at 160$^d$ (Fig. 26) for the purpose of receiving dogs similar to the dogs 231 to act on the rollers 242 and 243 in a manner similar to that described for the action of dogs 231 on the rollers 219 and 226. The several configurations 160$^d$ are aligned with the configurations 160$^a$ to permit the same pins to retain dogs in both series of configurations. It is thus apparent that suitable dogs may shift the clutch member 75 from a neutral or central, non-power-transmitting position into either position of engagement, or from either position of engagement into the other or from either position of engagement into a neutral or central position, suitable dogs thus providing complete control of the clutch movements in that the height of the roller contacting dog portion determines the amount of clutch movement and the contacting of the one or the other of the rollers determines the direction of such movement.

Figure 25:
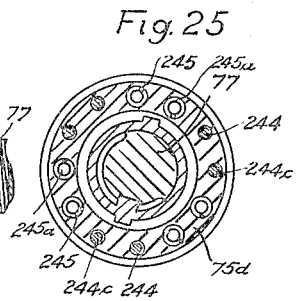
Fig. 25 is a vertical section along line 25—25 of Fig. 24.
Figure 20A:
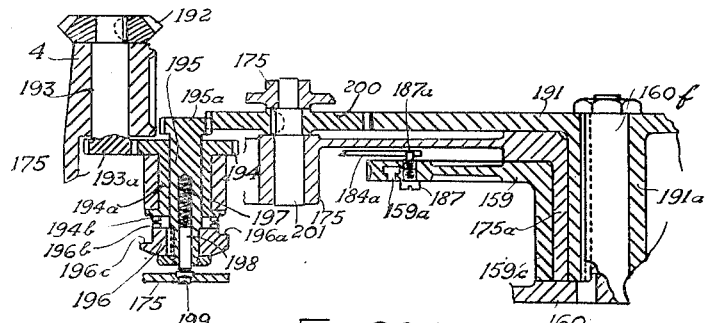
Fig. 20A is a developed section along line 20A—20A of Fig. 1.
Figure 21:
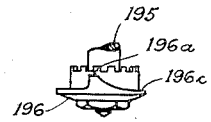
Fig. 21 shows a view of a detail part.
Figure 20:
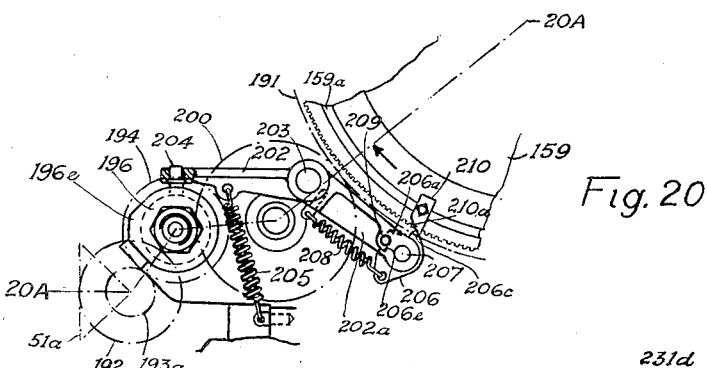
Fig. 20 shows a portion of the timer or timing device and a part of the driving and control mechanism associated therewith.

The motion transmitting connections from the rollers 242 and 243 to clutch member 75 are different from those previously described from the rollers 219 and 226 to the clutches controlled thereby in that the connections from rollers 242 and 243 provide no lost motion device. Such might have been provided and is contemplated for some applications but in the present embodiment it is considered preferable that the shifter dogs for the clutch member 75 should perform the full movement required of the clutch member, dogs of different height being provided for different movements as previously mentioned. But since such dogs are calculated to shift the clutch member positively, means are provided to prevent damage or breakage in the case that the complementary clutch teeth strike on their end faces when being moved into engagement. For this purpose the clutch member is of construction as particularly shown in Figs. 24 and 25. The clutch member which has previously been referred to as a member generally denoted by the numeral 75, consists in reality of three main parts, a portion 75$^b$, which carries the clutch teeth complementary to the clutch teeth 73$^a$, a portion 75$^c$ which carries the clutch teeth complementary to the clutch teeth 74$^a$ and a central portion 75$^d$ of spool form which provides the annular groove 75$^a$ which is engaged by the shifter fork 112. The central portion is connected for positive movement with each of the other members in one direction only, namely the direction which disengages the member from the complementary clutch teeth. In the other direction the movement is impositive although strongly urged whenever the central member is moved. The means by which this is accomplished for the member 75$^b$ are as follows. A plurality of screws 244 are threaded at 244$^a$ into the member 75$^d$ and provide head portions 244$^b$. A plurality of springs 245 are spaced alternately with the screws as indicated in Fig. 25, and thrust in the one direction against the bottom of the bore in which they enter in the member 75$^d$ and in the other direction against the shoulder of the member 75$^b$, thus strongly thrusting the member against the heads 244$^b$. Space is provided at 75$^e$ and at 75$^f$ to permit the member to move back against the resistance of springs 245, and should the opposed teeth meet on their end faces during the engagement of the clutch member such movement of 75$^b$ relative to 75$^d$ takes place, although it will almost immediately follow that the clutch teeth 73$^a$ will revolve sufficiently to permit engagement, when engagement will take place from the pressure of the springs. When disengagement occurs however the heads 244$^b$ act to positively move the member 75$^b$ along with member 75$^d$.

Springs and screws similar to 245 and 244 are provided between the member 75$^c$ and member 75$^d$ for similar purpose. Altho not shown for the sake of clearness in Fig. 24 the springs are indicated in Fig. 25 at 245$^a$, and the screws at 244$^c$.

The rod 215 is connected for movement with the reverser clutch member 81 as follows: A lever 246 (see Figs. 3, 15, etc.) is pivoted on a pin 247 fixed in knee 4 and is provided with arms, one of which has gear teeth 246$^b$ engaging with suitable rack teeth in the rod 145 which is connected for movement with clutch member 81 as previously described. Another arm of the lever 246 is provided with a pivoted shoe 248 engaging a suitable slot in a rod or bar 249 slidably supported in knee 4. A lever 250 is pivoted on the pin 128 but not connected for movement with the member 127 previously described as pivoted thereon. Lever 250 is provided with a pivoted shoe 251$^a$ engaging a suitable slot 215$^a$ in the rod 215, and with a pivoted shoe 251$^b$ engaging a suitable slot 249$^a$ in the rod 249. By the mechanism described the rod 215 is connected for movement with the clutch member 81. A member 212$^c$ pivoted on the pin 211 is connected for movement with rod 215 and with a roller 252 and a roller 253 (see Fig. 26 etc.) in a manner precisely similar to the connection previously described between member 212$^a$ rod 213 and rollers 219 and 226. By the above described motion transmitting connections the engagement of clutch member 81 in either direction will move one or the other of rollers 252 or 253 toward the shifter member 160. A series of configurations or slots one of which is shown at 160$^e$ are provided in the member 160 precisely similar to the configurations 160$^a$, and dogs similar to the dogs 231 may be mounted therein and suitably dimensioned and positioned to contact the one or the other of the rollers 252 or 253 as the case may be and move it as desired as previously described for rollers 219 and 226. It is thus apparent that suitable dogs may shift the clutch member 81 from a neutral or central non-power-transmitting position into either position of engagement or from either position of engagement into the other, or from either position of engagement into a neutral or central position, the dogs thus providing complete control of the clutch movement in that the height of the roller contacting dog portion determines the amount of clutch movement and the contacting of the one or the other of the rollers determines the direction of such movement. For clutch member 81 the same as for the clutch member 75 no lost motion device is provided in the motion transmitting connections between the rollers and the clutch controlled thereby. The dogs which act on the rollers 252 and 253 therefore shift the clutch member 81 to the full extent of the movement required, either into a neutral position from either position of engagement or into the opposite engagement. The clutch member 81 is therefore, and for the same reasons, also provided with means for causing positive disengagement but impositive engagement exactly similar to that provided and previously described for clutch member 75 there being similar portions 81$^b$, 81$^c$, 81$^d$ (see Fig. 1) corresponding to the previously described portions 75$^b$, 75$^c$, 75$^d$ and connected for movement by screws and springs not shown but similar to those employed for the clutch 75.

The individual configurations or slots 160$^e$ are aligned with and spaced similarly to the slots 160$^a$ and 160$^d$, the slots of the different series being in sets whereby a single screw or bolt 232 may retain a dog in each slot of a given set and whereby the several dogs of a given set may act at the same time or practically so upon the clutches controlled thereby. There are in this instance slots provided for thirteen sets of dogs, although any suitable number might have been used, spaced at equal distance around the periphery of shifter member 160, the number corresponding to the fractional revolution of the shifter member each time it is caused to be actuated from the dogs on the timer member 159 as previously described. The relationship and movement of shifter member 160 to the various clutch controlling rollers is such that during any movement of the shifter member the dogs of one set will be caused to move past the various clutch controlling rollers to an extent sufficient to bring about the clutch movement in accordance with dogs of the set. It is obvious that dogs may be omitted from any or all of the slots constituting a given set, whereby only such clutches as desired may be moved by any given shifter movement.

*Summary of operation.*

The several supports, knee, saddle and table are ordinarily operated in cycles, that is to say through a movement which includes starting from and returning to a given point, whereby the table may be moved from and return to a given point in a plurality of paths. Ordinarily the cycle of support movement includes movement of one of the supports, and often two, but it is seldom that a cycle is required which would require movement of the three supports. The transmissions are therefore arranged as described to provide an individual reverser for the table transmission, and a second reverser which may be effective either on the saddle or knee in accordance with the setting of the clutch lever 135 altho it is obvious that individual reversers might be provided for each support and each controlled as herein disclosed. The control mechanism described thus provides that the table may be operated alone, or in combination either with the saddle or knee, in which case the movements of the table and the other support may take place either simultaneously or first one and then the other in any order, or partly the one and partly the other. It is also possible by the control mechanism here disclosed to bring either or both supports to a stop to be started again by the control mechanism after an interval. Since the several supports serve a common cutting tool it is not necessary that either the transmission or the control mechanism should provide for operation of one support at a feed rate while another is operating at a quick traverse rate, for if the tool is in work contact any support which is moved should be moved at a feed rate, while if the tool is not in contact with the work any support, if moved at all should move at a quick or rapid traverse rate to reduce the idle machine time, therefore the transmission and control mechanism for shifting from feed to rapid traverse rate is simplified by making it operative on all supports, simultaneously.

It is desirable for several reasons that, except as noted below, the timer member 159 should make a trifle less than one revolution while the various supports are completing their movements and returning to their zero or starting points. The movement of the timer member, owing to the arrangement of its transmission, whereby the timer member derives motion through the clutch member 45 changes from a feed to rapid traverse rate whenever the rate of the supports are so changed, and to this extent the time of one revolution of the timer member is changed according to variations in support movement without further provision, but since the time of the support movements may vary from that required for a relatively short movement of a single support up to the full movement of two supports the means for changing the time of the timer movement to correspond to different lengths of table travel, as represented by the change gears 168, 169 previously described, has been provided in the driving train for the timer. Thus it is insured that dogs may be placed on the timer member to control the support movements at any time during any cycle yet shortly after the supports have completed their cycle the timer member will also complete its cycle in readiness to start a new cycle of support movement without delay.

It is desirable that, except as will be noted, the shifter member 160 should be actuated through a complete revolution, which may be termed a cycle of shifter member movement, during the time that the timer member 159 and the various supports are completing their respective cycles of movement, even though the number of periods at which clutch shifting takes place in order to complete the cycle of table movement does not require the use of all the dog stations on the shifter member. In such cases it is only necessary to leave without dogs such shifter stations as are not required and to place sufficient dogs on the timer member to cause the shifter member to be actuated past such idle stations at some convenient time during the cycle. Thus the shifter member will be brought back to its zero or starting point ready to start a new cycle without loss of time.

When the support movements involved in a single cycle are comparatively very simple, so that comparatively few dog stations are required on the shifter member, and are likewise comparatively short so that a relatively small time is required to complete the cycle, it is contemplated that two or more cycles of support movement may be performed during one cycle of shifter member movement and during one cycle of timer member movement. In such case the change gears in the timer member train are provided such as to give a trifle less than one timer member cycle or revolution during the combined several cycles of support movement, and two or more similar sets of dogs are provided for the stations of the shifter member and arranged to take effect one after the other, each set being composed of dogs adapted to produce the complete cycle of support movement required.

While it is possible to control the support movements entirely from the timer and shifter movements, it is preferable that the movements of each support should in part, be controlled from the movement of the support by the means of the other control mechanism disclosed. For instance each support, at least once during its cycle of movement and preferably when the support returns to its zero or starting point, should have its movement interrupted from the support movement by the means of the mechanism described under the heading "Trips Movable from Support Movement." The movement may at all other times be controlled from the shifter member but such interruption once during the cycle of support movement insures that successive cycles of support movement are maintained without substantial variation relative to the position of the tool or cutter and likewise relative to the timer member since the cyclic support movement is then tripped from support movement and started again from the timer member movement.

The complete machine cycle when controlled from the timer and shifter consists of at least one complete cycle of support movements together with one revolution of the timer member and one revolution of the shifter member. It has previously been described that the timer member may be stopped after completing a revolution and may thereafter be started in motion again at any time by the proper manual control of the operator. In such case it is obvious that no support movement will take place until the timer member is started on a subsequent revolution, following which the complete machine cycle will be performed. It is sometimes desirable that the timer should be permitted to start its next revolution immediately without the attention of the operator and in such case the screw or stop 187 in the timer member is removed whereupon the timer will continue to revolve and the machine cycle will be repeated indefinitely.

The various manual controls for support movements are provided primarily for the purpose of operating the machine when there is only a small quantity of work parts to be operated upon or when for other reasons the use of other controls is not advisable, but it is very undesirable that any of the manual controls should be capable of operation either intentionally or inadvertently during the machine cycle and when the cycle is controlled from the timer and shifter members, since such manual operation might throw the support thereby affected completely out of position or time relative to the timer and shifter member, causing subsequent damage. To prevent such results, the dogs on the shifter member are, in certain cases, provided with projecting portions typified by the portion 231$^d$ shown on the dog 231 (Fig. 26) and of such height as to provide an interference piece to contact the other roller of the pair which has just been shifted by the dog, whereby both rollers and consequently the clutch with which they are connected is prevented from movement until the shifter member is again moved. The extra interference portion is of course necessary only when the dog has shifted the clutch into a central or neutral position from which it might be manually moved into the opposite engagement, for the dog which has just moved the clutch prevents it from moving back to the previous position and in the case that the dog which has just moved the clutch has shifted it into either engagement it can neither be further shifted nor returned until the shifter member has moved. It frequently occurs that the shifter member having been moved to cause a shifting of a certain clutch may then be moved to cause the shifting of another clutch, but without shifting the clutch shifted in the previous movement. It would not then be necessary to provide a dog for the clutch shifted in the previous shifter movement, since the clutch is already positioned, but it is desirable to do so, since the dog, being a duplicate of the dog which previously shifted the clutch will not move the clutch but will prevent undesired manual clutch movement.

It has been stated that once per cycle of each support movement, the movement should be interrupted by the means of a support dog. Obviously the necessary clutch element cannot be shifted out of engagement by the means of a support dog if it has been previously shifted into engagement by the means of a shifter dog unless at some time before it is desired to shift out by the support dog the shifter member is moved to move the shifter dog from contact with the roller by the means of which the clutch element was engaged. Preferably just prior to the timer when the clutch element is to be shifted to stop the support by the means of a support dog, the shifter member should be moved by the means of a dog on the timer member to a position in which there is no dog on the shifter which will oppose movement of the clutch element by the means of the support dog.

Although some of the mechanism as shown in the drawings is not positioned in accord with a given position in the cycle of machine movement in the several views, nor in the same relative position in different views, it is to be noted that such variations have been made for the benefit of a clear description of the mechanism. the construction and operation of which has been described to be clearly apparent to those familiar with the art.

Many equivalents of the mechanism shown may be used, each of which are within the spirit and scope of the claims herewith and each of which it is desired to protect by the claims.

We claim:

1. In a machine tool having a movable support and clutch controlled transmission mechanism therefor, the combination of control means for the shifting of a clutch element of said mechanism; said means including shifter and timer members, each movable independently of said support and of each other, and transmission mechanism operatively connectible for power movement of each of said members without movement of said support.

2. In a machine tool having a movable support and clutch controlled transmission mechanism therefor, the combination of control means for the movement of a clutch element of said mechanism; said means including a timer member having uni-directional power motion, transmission mechanism operatively connectible for power movement thereof when said support is stationary and a shifter member having a step by step power motion released from the movement of said timer member.

3. In a machine tool having a reciprocable support and clutch controlled transmission mechanism therefor, the combination of control means for the shifting of a clutch element of said mechanism, said means including a timer member and a clutch shifter member each movable in rotary cycles for operation at predetermined stations therein, and transmission mechanism for the movement of said members.

4. In a machine tool having a movable support and clutch controlled transmission mechanism therefor, the combination of control means for the movement of a clutch element of said mechanism; said means including a timer member and a shifter member, transmission mechanism connectible with said shifter member including a clutch, a dog on said timer member, means restraining the last named clutch from engagement, a trip element movable into the path of movement of said dog and connected to release the clutch restraining means, and transmission mechanism connected with said timer member.

5. In a machine tool having a movable support and clutch controlled transmission mechanism therefor, the combination of control means for the shifting of a clutch element of said mechanism, said means including a timer member and a shifter member each movable in rotary cycles, transmission mechanisms for power movement of said shifter member but normally inoperative, a dog on said shifter member, a trip element adjacent said shifter member and movable into the path of movement of said dog, motion transmitting connections between said trip element and said clutch element, and means associated with said timer member for causing the transmission mechanism for said shifter member to be operative thereon at intervals determined by the movement of said timer member.

6. In a machine tool having a movable support and clutch controlled transmission mechanism therefor, the combination of control means for the shifting of a clutch element of said mechanism, said means including a movable shifter member and a movable timer member, transmission mechanism for said shifter member including a clutch normally disengaged, a dog on said timer member for establishing the engagement of the last named clutch, a dog on said shifter member, a trip element movable into the path of movement of the last named dog and motion transmitting connections from said trip element to said clutch element in the support transmission.

7. In a machine tool having a movable support and clutch controlled transmission mechanism therefor, the combination of control means for a clutch element of said transmission including shifting means having a portion connectible with said clutch element, a constant speed transmission for movement of said portion but normally disconnected therefrom, a timer member, means associated therewith to connect the last named transmission, and a transmission connectible for movement of said timer member including a rate changer effective on the timer member but ineffective on said support.

8. In a machine tool having a movable support, the combination of transmission mechanism therefor including a power source and a shiftable clutch element operative to interrupt support movement, a shifter member operable for shifting said clutch element, a power train connectible to drive said shifter member but normally disconnected therefrom, a timer member, means associated with said timer member to connect said train at intervals, and a power train connected with said timer member; each of said trains being connected to be driven from said transmission at a point between said power source and said clutch element.

9. In a machine tool the combination of a movable support and clutch controlled transmission mechanism connectible therewith, and a plurality of control means for the movement of a clutch element of said mechanism, the one of said means including a shifter member having step by step movement controlled from an independently movable timer member and the other of said means including a trip element movable with said support; both said shifter member and said trip element being connectible with said clutch element.

10. In a machine tool, the combination of a movable support and clutch controlled transmission mechanism therefor, control means for the movement of a clutch member of said mechanism including a shifter member having step by step movement controlled from an independently movable timer member, a first and second dog on said shifter member, a trip element connected with said clutch member and movable into the path of movement of each of said dogs, a third dog movable with said support, and a trip element connected with said clutch element and movable into the path of movement of the last named dog; whereby said clutch member may be shifted into engagement to start movement of said support by the means of said first dog and may later be shifted out of engagement to stop said support by the means of said third dog, and may still later be shifted into engagement to again start support movement by the means of said second dog.

11. In a machine tool the combination with a movable support and clutch controlled transmission mechanism therefor, of control means including a shifter member, a plurality of dogs associated therewith, trip means movable into the path of movement of said dogs and connected with a clutch element in said transmission, a power train for said shifter member including a clutch member, a timer member having dogs mounted thereon, and trip means connected to said clutch member and movable into the path of movement of the last named dogs.

12. In a machine tool the combination of a movable support and clutch controlled transmission mechanism therefor, control means including a shifter member having a dog for the movement of a clutch element of said transmission, a power train connectible with said shifter member including a clutch member, timing means for the movement of said clutch member including a power movable timer member having a plurality of dogs and trip elements operatively associated therewith to engage said clutch member at intervals determined in part by the position of said dogs, and a device independent of said timing means to disengage said clutch member after a predetermined rotation thereof.

13. In a machine tool combining a tool support and a work support, one of which is bodily movable, the combination of a drive member on the other of said supports, a transmission train from said drive member including a shiftable clutch member and connectible with said movable support, and control means for said clutch member including a shifter member and transmission mechanism therefor controlled from a power actuated timer member; said clutch member, shifter member and timer member each being supported for bodily movement with said movable support.

14. In a machine tool having supports including a column, a knee, a saddle and a table each shiftable relative to the other, the combination of a drive member mounted on said column, a transmission train therefrom connectible with said table and including a shiftable cutch member movable with said saddle, control means for shifting said clutch member including a shifter member and transmission mechanism therefor controlled from a power actuated timer member, said shifter and timer members being supported for movement with said knee, and motion transmitting connections from said shifter member to said clutch member adapted to permit relative movement between the knee and the saddle.

15. In a milling machine combining a tool support, a work support and a supporting unit slidably adjustable between said supports, the combination of a drive member mounted on one of said supports and connectible to move the other support by the means of a transmission train including a clutch member, and control means for shifting said clutch member including a shifter member and transmission mechanism therefor controlled from a power actuated timer member; said clutch member, shifter member and timing member being adjustable with said supporting unit.

16. In a machine tool having a movable support and clutch controlled transmission mechanism therefor including a shiftable clutch element having power transmitting and non-power-transmitting positions, the combination of control means for the shifting of said element including a power operable clutch shifter member and motion transmitting connections adapted to transmit motion in either direction from said member to move said element from either position to the other position; said connections including means resiliently operative when moving from one of said positions but not when moving from the other.

17. In a machine tool having a movable support and clutch controlled transmission mechanism therefor, the combination of control means for the movement of a clutch element in said transmission including a shifter member for said clutch element, a constant speed power train connectible for the movement of said shifter member, and power operated timing means including a timing member movable when said support is stationary for connecting said power train with said shifter member at intervals.

18. In a machine tool having a movable support and transmission mechanism therefor including a plurality of shiftable clutch members collectively operable to change the rate and the direction of movement of said support, the combination of control means including a shifter member for said clutch members, a power train connectible with said shifter member, a timing device for connecting said power train at intervals, and transmission mechanism operative to actuate said device when said support is stationary.

19. In a machine tool having a movable support and transmission mechanism therefor including a plurality of shiftable clutch members collectively operable to change the rate and the direction of support movement, the combination of control means including a timer member having unidirectional power motion and a shifter member having power step by step motion controlled from said timer member and operable for shifting each clutch member.

20. In a machine tool having a movable support and transmission mechanism therefor including a plurality of shiftable clutch members collectively operable to change the rate and the direction of support movement, the combination of control means including a shifter member movable in rotary cycles for shifting each of said clutch members, a timer member movable in rotary cycles, and means associated with said timer member to establish movement of said shifter member at intervals determined by the movement of said timer member.

21. In a machine tool having a movable support and transmission mechanism therefor including a plurality of shiftable clutch members collectively operable to change the rate and the direction of support movement, the combination of control means including a shifter member for said clutch members, a timer member, a transmission train operatively connected to independently move said timer member, a transmission train connectible to move said shifter member, and means associated with said timer member for connecting the last named train at intervals.

22. In a machine tool having a movable support and transmission mechanism therefor including a plurality of shiftable clutch members collectively operable to change the rate and the direction of support movement, the combination of control means including a shifter member for said clutch members, a transmission train connectible with said shifter member and including a shiftable clutch member normally in a position of disengagement, a timer member connectible with the last named clutch member whereby to move it to a position of engagement at intervals, and a power train independently connected with said timer member.

23. In a machine tool having a movable support and transmission mechanism therefor including a plurality of shiftable clutch members collectively operable to change the rate and direction of support movement, the combination of control means for the movement of said members including an independently power movable timer member, a shifter member having power movement released at intervals from the movement of said timer member, a plurality of dogs on said shifter member, a plurality of trip elements respectively movable into the path of movement of the respective dogs, and motion transmitting connections from respective trip elements to the respective clutch members.

24. In a machine tool having a movable support and transmission mechanism therefor including a plurality of clutch members respectively shiftable to change the rate and the direction of support movement, the combination of control means for the movement of said members including a power movable timer member, a shifter member having dogs, motion transmitting connections cooperative with said dogs and connected with the respective clutch members, a dog on said timer member, transmission mechanism connected with said shifter member including a shiftable clutch element, and motion transmitting connections from the said clutch element and terminating adjacent the path of movement of the last named dog.

25. In a machine tool having a movable support and transmission mechanism therefor including a plurality of clutch members respectively shiftable to change the rate and the direction of support movement; the combination of control means including a shifter member for said clutch members, a constant speed power train connectible with said shifter member, and a power actuated timer member operatively associated therewith for connecting said train at intervals.

26. In a machine tool having a movable support and transmission mechanism therefor including a plurality of clutch members respectively shiftable to change the rate and the direction of support movement; the combination of control means including a shifter member for said clutch members, a timing member, a power train connected with said shifter member at intervals controlled from the movement of said timer member, and a power train independently connected with said timer member and including rate change means.

27. In a machine tool having a movable support, the combination of a drive member, a first power train driven therefrom and including feed change means, a second power train driven therefrom at a constant speed, clutch means shiftable to connect alternatively with either said first or second train, a shiftable clutch member, a third power train connecting said clutch means, said clutch member and said support, a movable shifter member connectible with both said clutch means and said clutch member, a power train connected from said second train and connectible with said shifter member, timing means adapted to connect the last named train with said shifter member and including a timer member, and a power train connected from said third train at a point between said clutch means and said clutch member and connected to said timer member.

28. A machine tool as specified in claim 27 in which the power train last named includes rate change means.

29. In a machine tool having a movable support and transmission mechanism therefor including a plurality of shiftable clutch members, one of which is shiftable in one direction to connect and in the other direction to disconnect said transmission, the combination of a shifter member having power movement controlled from a timer member, and a plurality of means for shifting the last mentioned clutch member, including a plurality of motion transmitting connections respectively operable from the movement of said support and from the movement of said shifter member.

30. In a machine tool having a movable support and transmission mechanism therefor including a plurality of shiftable clutch members collectively operable to change the rate and the direction of support movement, the combination of control means including a power operable shifter member having a plurality of dogs respectively connectible to shift respective of said clutch members and arranged to move in parallel paths, and means for establishing the connection of said dogs with said members at intervals including a power operable timer member having a plurality of dogs arranged for movement in the same path.

31. In a machine tool having a movable support and transmission mechanism therefor including a plurality of shiftable clutch members one of which is shiftable in one direction to connect and in the other direction to disconnect said transmission, the combination of control means including a power operable shifter member having a plurality of dogs respectively connectible to shift the respective clutch members and arranged to move in parallel paths, means for establishing the connection of said dogs with said clutch members at intervals including a power operable timer member having a plurality of dogs arranged for movement in the same path, a dog on said support and motion transmitting connections having a portion movable into the path of movement of the last named dog and connected to shift one of said clutch members.

32. In a machine tool having a support movable in a plurality of transverse paths and transmission mechanism therefor including a plurality of clutch members respectively shiftable to determine support movement in the respective paths, the combination of control means including a shifter member for said clutch members, a power train connectible with said shifter member, and means to establish the connection of said train at intervals including an independently power actuated timer member.

33. In a machine tool having a movable support and transmission mechanism therefor including a plurality of clutch members respectively shiftable to change the rate and the direction of support movement, the combination of control means including power operable shifter member having a plurality of dogs respectively connectible to shift the respective clutch members and arranged to move in parallel paths, means for establishing the connection for said dogs with said clutch members at intervals including a power operable timer member having a plurality of dogs arranged for movement in the same path, a dog on said support, and motion transmitting connections having a portion movable into the path of movement of the last named dog and connected to shift one of said clutch members.

34. In a machine tool having a support movable in a plurality of transverse paths and transmission mechanism therefor including a plurality of clutch members respectively shiftable to determine support movement in the respective paths, the combination of control means including a shifter member for said clutch members, and means for establishing power movement of said shifter member at intervals including a movable timer member and a transmission mechanism connected for movement thereof when both said support and said shifter member are stationary.

35. In a machine tool having a support movable in a plurality of transverse paths and transmission mechanism therefor including a plurality of clutch members respectively shiftable to determine the direction of support movement in the respective paths, the combination of control means including a shifter member, a plurality of dogs movable therewith, trip devices movable into the path of movement of the respective dogs and having motion transmitting connection with the respective clutch members, a constant speed power train connectible with said member, and means for connecting said power train at intervals including a power operable timer member.

36. In a machine tool having a support movable in a plurality of transverse paths and transmission mechanism therefor including a shiftable reverser member, the combination of a plurality of power trains respectively individual to the respective paths of support movement and each connectible to be actuated from said reverser member, control means including a movable shifter member, a plurality of dogs movable therewith, trip elements movable into the path of movement of one or the other of said dogs and connected for movement with said reverser member whereby said dogs may shift said reverser member in either direction, another power train, and means for establishing the connection of the last named power train with said shifter member at intervals including a power actuated timer member.

37. In a machine tool, the combination of a support movable in a plurality of transverse paths, transmission mechanism therefor including a plurality of reverser members respectively shiftable to determine the direction of support movement in the respective paths and including clutch means shiftable to change the rate of support actuation, control means including a movable shifter member having dogs, motion transmitting connections from each of said reverser members and from said clutch means each including a portion movable into the path of movement of one of said dogs whereby said reverser members and clutch means may each be shifted from dog movement, a transmission train connectible with said shifter member, and means for connecting said train at intervals including a power operable timer member.

38. In a machine tool the combination of a support movable in a plurality of transverse paths; transmission mechanism therefor including a feed train, a power rapid traverse train and a plurality of other trains respectively individual to the respective paths of movement, said transmission mechanism also including clutch means shiftable to simultaneously connect both of said other trains either with said feed train or with said rapid traverse train, control means including a movable shifter member, a dog movable therewith, a trip element movable into the path of movement of said dog and having motion transmitting connection with said clutch means, another power train connectible with said shifter member and means for establishing the connection of the last named train at intervals including a power operated timing member.

39. In a machine tool having a support movable in a plurality of transverse paths, the combination of transmission mechanism for effecting like feed rates but different rapid traverse rates in the different paths including a feed train, a rapid traverse train, a clutch member shiftable to be driven from the one or the other of said trains, a plurality of gear pairs of different ratio connected to be driven from said clutch member, and a power train connectible to move said support in one of said paths including a clutch element shiftable simultaneously with said clutch member to be driven from the one or the other of said gear pairs.

40. A machine tool as specified in claim 39, in combination with control means including a shifter member for said clutch member and said clutch element, a power device connectible with said shifter member, and means for connecting said power device at intervals including a power operated timer member.

41. In a machine tool having a support movable in a plurality of transverse paths, the combination of transmission mechanism for effecting like feed rates but different rapid traverse rates in the different paths including a feed train, a rapid traverse train, a clutch member shiftable to be driven from the one or the other of said trains, a gear train connected with said clutch member and connectible for support movement in one of said paths, a plurality of gear pairs of different ratio connected with said clutch means, and a clutch element connectible for support movement in the other of said paths and shiftable to be driven from the one or the other of said gear pairs.

42. In a machine tool having a support movable in a plurality of transverse paths, the combination of transmission mechanism therefor including gear trains of different ratio connectible with said support for movement thereof in the respective paths and including clutch means shiftable to connect or disconnect said gear trains; and control means including a shifter member for said clutch means, a power train connectible therewith, and means for connecting said power train at intervals including a power operated timer member.

43. In a machine tool having a plurality of movable supports, the combination of transmission mechanism therefor including clutch elements shiftable to determine the movement of each of said supports, and control means including a shifter member for said clutch elements, a power train connectible therewith and a power operated timer member for establishing the connection of said power train at intervals.

44. In a machine tool having a plurality of movable supports and transmission mechanism therefor including a plurality of reverser members each shiftable to alternative positions determinative of the direction of movement of the respective supports, the combination of control means including a movable shifter member, dogs on said shifter member, a plurality of trip parts respectively movable into the path of movement of the respective dogs, motion transmitting connections from the respective trip parts to the respective reverser members, a power train connectible with said shifter member, and means for connecting said power train at intervals including a power operated timer member.

45. In a machine tool having a plurality of movable supports and transmission mechanism therefor including a reverser member shiftable to change the direction of movement of a portion of said mechanism, the combination of control means including a shifter member connectible with said reverser member, a power train connectible therewith, means for establishing such connection at intervals including a power movable timer member, and clutch means in said transmission mechanism shiftable to connect said reverser element with the one or the other of said supports.

46. In a machine tool having a plurality of movable supports and transmission mechanism therefor including a plurality of reverser members respectively shiftable to change the direction of movement of the respective supports and clutch means shiftable to change the rate of support movement, the combination of control means including a shifter member selectively connectible with each of said reverser members and with said clutch means, a power train, and means for connecting said power train with said shifter member at intervals including a power operated timer member.

47. In a transmission and control mechanism for machine tools, having a plurality of movable supports and having clutch elements shiftable for changing the direction and the rate of movement of each of said supports;

the combination of mechanism for the selective shifting of said clutch elements including a shifter member, dogs removably mounted thereon in sets determinative of the elements to be shifted, trip parts adjacent said shifter member and arranged for the different trip parts to be substantially simultaneously contacted by the different dogs of a given set, motion transmitting connections from respective trip parts to the respective elements; a power train connectible with said shifter member and means for connecting said power train at intervals including a power operated timing device; whereby first one and then another of said dogs sets will be operative to shift some of said clutch elements.

48. In a machine tool having a support movable in three transverse paths and clutch controlled transmission mechanism including shiftable clutches effective to change the rate and direction of support movement in each of said paths, the combination of control means including trip parts respectively connected for movement with the respective shiftable clutches, a shifter member provided with dogs adapted to contact with said trip parts selectively, a power train connectible with said shifter member, and means for connecting said power train at intervals including a power operated timer member.

49. In a machine tool having a support movable in three transverse paths the combination of transmission mechanism therefor including a plurality of reverser members respectively shiftable to change the direction of movement of different portions of said mechanism and having clutch means movable to connect said support for movemet in either of two of said paths from one of said portions, control means including a shifter member potentially operative upon each of said reverse members, a power train connectible with said shifter member, and means for connecting said power train at intervals including a power operated timer member.

50. In a machine tool having three movable supports and clutch controlled transmission mechanism therefor including a plurality of reverser members respectively shiftable to change the direction of movement of different portions of said mechanism, the combination of control means including a movable shifter member having dogs, trip parts respectively connected for movement with the one or the other of said reverser members and movable into the path of movement of some of said dogs, a power train connectible with said shifter member, a power operated timer member for connecting said train at intervals, and clutch means shiftable to connect one of said transmission portions to different supports.

51. In a machine tool having three movable supports and transmission mechanism therefor including shiftable clutch members collectively determinative of the movement of each support, the combination of control means for selectively shifting some of said members including a movable shifter member having dogs, trip parts connected for movement with the members to be shifted and movable into the path of movement of some of said dogs, a power train connectible with said shifter member, and means for connecting said power train at intervals including a power operated timer member.

52. In a machine tool having a movable support and transmission mechanism therefor including a clutch element shiftable between a first position effective to connect said mechanism with said support and a second position effective to disconnect said mechanism, the combination of control means for shifting said element including an adjustable dog movable with said support, a trip element connected for movement with said clutch element and movable into the path of movement of said dog whereby the dog may contact the trip element and move the clutch element into said second position during support movement; and means for shifting said element from its second to its first position including a movable shifter member, a dog thereon, a trip part connected with said clutch element and movable into the path of movement of the last named dog, a power train connectible with said shifter member, and means for connecting said power train at intervals including a power operated timing device.

53. In a machine tool having a movable support and transmission mechanism therefor including a shiftable clutch member, the combination of control means for shifting said clutch member including a shifter member operative to shift said member in either direction, a power train connectible with said shifter member, and means for connecting said power train at intervals including a power driven timer member.

54. In a machine tool having a plurality of movable supports and a power member the combination of a plurality of power trains connected with said power member one of which includes feed change elements, clutch means shiftable to engage with either of said trains, branch line trains each including a shiftable clutch member and each connectible from said clutch means to one of said supports; and control means for the shifting of said clutch means and each of the clutch members including a movable shifter member, a constant speed power train deriving motion from said power member and connectible with said shifter member, and means for connecting the last named train at intervals including a timer member having a power train connected to be driven from said clutch means exclusive of said branch lines.

55. In a machine tool having a movable support the combination of a power member, a plurality of power trains connected with said power member one of which includes feed change elements, clutch means shiftable to engage with either of said trains, a transmission train including said clutch means, a shiftable reverser member and said support in the order named; together with control means for the shifting of said clutch means and said reverser member including a movable shifter member, a constant speed train deriving motion from said power member and connectible with said shifter member, and means for connecting said constant speed train at intervals including a timer member having a power train connected to be driven from said transmission train at a point between said clutch means and said reverser member.

56. A machine tool as specified in claim 54 in which the power train last named in the claim is provided with rate change means.

57. A machine tool as specified in claim 55 in which the power train last named in the claim is provided with rate change means.

58. In a machine tool having a movable support, a power member, and transmission mechanism connected with said support and with said power member including a shiftable motion interrupting clutch member; the combination of control means for shifting said clutch member including a movable shifter member, a power train deriving motion from said power member and connectible to drive said shifter member, and means for connecting said power train at intervals including a power operable shifter member connected to be actuated from said power member.

59. In a machine tool having a movable support and clutch controlled transmission mechanism therefor, the combination of control means including a hand lever connected for movement of a clutch member in said transmission, a power operated shifter member having a step by step motion, a motion transmitting member adjacent said shifter member and connected with said clutch member, and a dog on said shifter member adapted to cooperate with said motion transmitting member to prevent movement of said clutch member from said hand lever when said shifter member is in one position of its movement.

In witness whereof we hereto affix our signatures.

EDWARD J. KEARNEY.
JOSEPH B. ARMITAGE.